(12) United States Patent
Kim et al.

(10) Patent No.: US 11,166,322 B2
(45) Date of Patent: Nov. 2, 2021

(54) METHOD FOR PERFORMING RANDOM ACCESS PROCESS AND APPARATUS THEREFOR

(71) Applicant: LG Electronics Inc., Seoul (KR)

(72) Inventors: Jaehyung Kim, Seoul (KR); Changhwan Park, Seoul (KR); Joonkui Ahn, Seoul (KR); Seokmin Shin, Seoul (KR); Suckchel Yang, Seoul (KR); Seunggye Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/637,645

(22) PCT Filed: Aug. 9, 2018

(86) PCT No.: PCT/KR2018/009127
§ 371 (c)(1),
(2) Date: Feb. 7, 2020

(87) PCT Pub. No.: WO2019/031889
PCT Pub. Date: Feb. 14, 2019

(65) Prior Publication Data
US 2020/0260495 A1    Aug. 13, 2020

Related U.S. Application Data

(60) Provisional application No. 62/543,351, filed on Aug. 9, 2017.

(30) Foreign Application Priority Data

Apr. 9, 2018    (KR) .................. 10-2018-0040807

(51) Int. Cl.
*H04W 74/08*    (2009.01)
*H04W 74/00*    (2009.01)

(52) U.S. Cl.
CPC ..... *H04W 74/0833* (2013.01); *H04W 74/006* (2013.01)

(58) Field of Classification Search
CPC ............. H04L 27/2602; H04L 27/2607; H04L 27/2646; H04L 5/0048; H04W 74/006; H04W 74/0833
See application file for complete search history.

(56) References Cited

U.S. PATENT DOCUMENTS

2015/0181624 A1*  6/2015  Hwang ................. H04L 5/0053
                                                                 370/329
2018/0131547 A1*  5/2018  Wang .................... H04L 5/0094
(Continued)

FOREIGN PATENT DOCUMENTS

WO    WO2014003339    1/2014
WO    WO2017052319    3/2017

OTHER PUBLICATIONS

Huawei, HiSilicon, "On support of larger cell radius for NPRACH," R1-1707025, 3GPP TSG RAN WG1 Meeting #89, Hangzhou, China, dated May 15-19, 2017, 5 pages.
(Continued)

*Primary Examiner* — Liton Miah
(74) *Attorney, Agent, or Firm* — Fish & Richardson P.C.

(57) ABSTRACT

The present invention relates to a method for performing, by a terminal, a random access process in a wireless communication system supporting first and second preamble formats, and an apparatus therefor. Particularly, the present invention relates to a method comprising: a step of receiving narrowband physical random access channel (NPRACH) configuration information; and a step of transmitting a random access preamble on the basis of a preamble format indicated by the NPRACH configuration information of the first and second preamble formats, wherein the length of one symbol of the second preamble format corresponds to three (Continued)

times the length of one symbol of the first preamble format, and the first preamble format has a frequency grid spacing of 3.75 kHz, and the second preamble format has a frequency grid spacing of 1.25 kHz, and to an apparatus therefor.

12 Claims, 10 Drawing Sheets

(56) References Cited

U.S. PATENT DOCUMENTS

| | | | |
|---|---|---|---|
| 2018/0176957 A1* | 6/2018 | Zhang | H04L 1/08 |
| 2018/0206271 A1* | 7/2018 | Chatterjee | H04L 5/0053 |
| 2018/0279363 A1* | 9/2018 | Su | H04L 1/08 |
| 2018/0302921 A1* | 10/2018 | Wang | H04W 74/08 |
| 2019/0045525 A1* | 2/2019 | Shi | H04L 5/0053 |
| 2019/0098659 A1* | 3/2019 | Reddy | H04W 74/0833 |
| 2020/0022173 A1* | 1/2020 | Luo | H04L 5/0055 |
| 2020/0128587 A1* | 4/2020 | Qian | H04W 74/0833 |
| 2020/0367291 A1* | 11/2020 | Lu | H04W 74/0866 |
| 2020/0383144 A1* | 12/2020 | Sun | H04W 72/0453 |

OTHER PUBLICATIONS

LG Electronics, "NPRACH range enhancement for NB-IoT," R1-1707575, 3GPP TSG RAN WG1 Meeting #89, Hangzhou, P.R. China, dated May 15-19, 2017, 5 pages.

LG Electronics, "NPRACH reliability for NB-IoT," R1-1707576, 3GPP TSG RAN WG1 Meeting #89, Hangzhou, P.R. China, dated May 15-19, 2017, 3 pages.

PCT International Search Report and Written Opinion in International Application No. PCT/KR2018/009127, dated Nov. 14, 2018, 18 pages (with English translation).

Qualcomm Incorporated, "NPRACH support for large cell access," R1-1708806, 3GPP TSG RAN1 #89, Hangzhou, Zhejiang, China, dated May 15-19, 2017, 3 pages.

EP Extended European Search Report in European Appln. No. 18843479.9, dated Mar. 24, 2021, 10 pages.

Huawei, HiSilicon, "On the support of larger cell radius for NPRACH," R1-1704294, 3GPP TSG RAN WG1 Meeting #88bis, Spokane, USA, dated Apr. 3-7, 2017, 3 pages.

* cited by examiner

METHOD FOR PERFORMING RANDOM ACCESS PROCESS AND APPARATUS THEREFOR

CROSS-REFERENCE TO RELATED APPLICATIONS

This application is a National Stage application under 35 U.S.C. § 371 of International Application No. PCT/KR2018/009127, filed on Aug. 9, 2018, which claims the benefit of Korean Application No. 10-2018-0040807, filed on Apr. 9, 2018, and U.S. Provisional Application No. 62/543,351, filed on Aug. 9, 2017. The disclosures of the prior applications are incorporated by reference in their entirety.

TECHNICAL FIELD

The present disclosure relates to a wireless communication system, and more particularly, to a method and device for performing a random access procedure for effective range enhancement.

BACKGROUND ART

As more and more communication devices require a larger communication capacity, there is a need for mobile broadband communication enhanced over existing radio access technology (RAT). In addition, massive Machine Type Communications (MTC) capable of providing a variety of services anywhere and anytime by connecting multiple devices and objects is one of important issues to be considered in the next-generation communications. Moreover, communication system design considering services/UEs sensitive to reliability and latency is under discussion. Thus, introduction of a new radio access technology considering enhanced mobile broadband communication, massive MTC (mMTC), and Ultra-Reliable and Low Latency Communication (URLLC) is being discussed. In the present disclosure, for simplicity, this technology will be referred to as new RAT (NR).

DISCLOSURE

Technical Problem

An object of the present disclosure is to provide a method for performing an efficient random access procedure in a wireless communication system that simultaneously supports a legacy preamble and an enhanced preamble, and an apparatus therefor.

Another object of the present disclosure is to provide an efficient NPRACH resource configuration method in a wireless communication system that simultaneously supports a legacy preamble and an enhanced preamble, and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In one aspect of the present disclosure, provided herein is a method for performing, by a terminal, a random access procedure in a wireless communication system supporting a first preamble format and a second preamble format. The method may include receiving narrowband physical random access channel (NPRACH) configuration information, and transmitting a random access preamble based on a preamble format indicated by the NPRACH configuration information among the first preamble format and the second preamble format, wherein one symbol length of the second preamble format may corresponds to three times one symbol length of the first preamble format, wherein the first preamble format may have a frequency grid spacing of 3.75 kHz and the second preamble format has a frequency grid spacing of 1.25 kHz.

In another aspect of the present disclosure, provided herein is a terminal for performing a random access procedure in a wireless communication system supporting a first preamble format and a second preamble format. The terminal may include a radio frequency (RF) transceiver, and a processor operatively connected to the RF transceiver, wherein the processor is configured to control the RF transceiver to receive narrowband physical random access channel (NPRACH) configuration information and transmit a random access preamble based on a preamble format indicated by the NPRACH configuration information among the first preamble format and the second preamble format, wherein one symbol length of the second preamble format may corresponds to three times one symbol length of the first preamble format, wherein the first preamble format may have a frequency grid spacing of 3.75 kHz and the second preamble format has a frequency grid spacing of 1.25 kHz.

A resource configuration for the first preamble format and a resource configuration for the second preamble format may be Frequency Division Multiplexed (FDMed) in a frequency domain.

A starting frequency position in a resource configuration for the second preamble format may be set by adding or subtracting a frequency offset to or from a frequency grid selectable as a starting frequency position in a resource configuration for the first preamble format.

The frequency offset may be set to be equal to a minimum hop distance for the second preamble format, where the minimum hop distance may be 1.25 kHz.

The frequency offset may be cell-specifically set.

The frequency offset may be set equally for terminals having the same time resource in the resource configuration for the second preamble format.

A frequency grid spacing selectable as a starting frequency position in a resource configuration for the second preamble format may be set to a value less than a frequency grid spacing selectable as a starting frequency position in a resource configuration for the first preamble format.

A random access preamble ID (RAPID) for the second preamble format may be distinguished by a starting frequency in a resource configuration for the second preamble format.

A preamble boundary according to the second preamble format may be configured to be aligned with a preamble boundary repeated $2^n$ times in a time domain according to the first preamble format, where n may be a positive integer, and ^ may denote a power.

When the NPRACH configuration information indicates the second preamble format, the NPRACH configuration information may include index information indicating a period allowing transmission of the random access preamble to be started therein, where the index information may have a value of 0 in a period containing a system frame number (SFN)=0.

When the NPRACH configuration information indicates the second preamble format, index information indicating a period allowing transmission of the random access preamble to be started therein may be limited to satisfy (i mod N)=k, where i may denote the index information, N and k may denote values pre-allocated to the terminal, and mod may denote a modulo function.

Advantageous Effects

According to the present disclosure, a random access procedure may be efficiently performed in a wireless communication system that simultaneously supports a legacy preamble and an enhanced preamble.

According to the present disclosure, NPRACH resource configuration may be efficiently performed in a wireless communication system that simultaneously supports a legacy preamble and an enhanced preamble.

It will be appreciated by persons skilled in the art that the objects that could be achieved with the present disclosure are not limited to what has been particularly described hereinabove and the above and other objects that the present disclosure could achieve will be more clearly understood from the following detailed description.

DESCRIPTION OF DRAWINGS

The accompanying drawings, which are included to provide a further understanding of the disclosure, illustrate embodiments of the disclosure and together with the description serve to explain the principle of the disclosure.

BEST MODE

Figure 1:
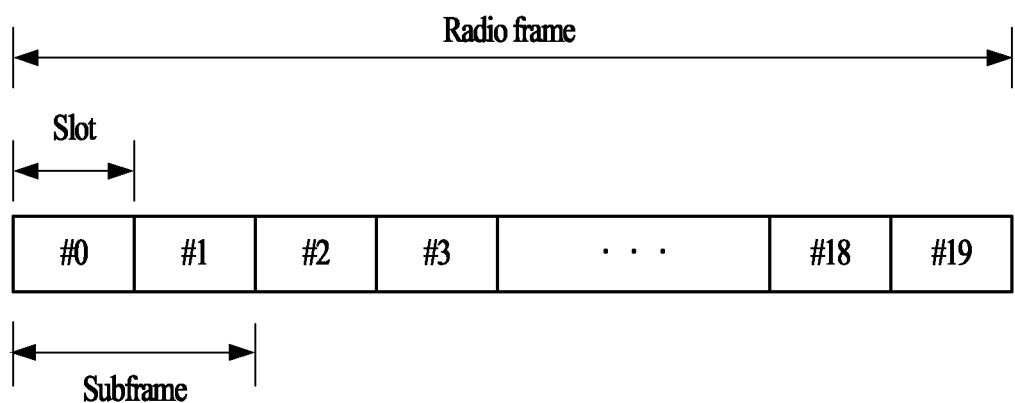
FIG. 1 illustrates a structure of a radio frame that may be used in the present disclosure.

The following embodiments of the present disclosure can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through wireless (or radio) technology such as universal terrestrial radio access network (UTRAN) or CDMA2000. TDMA may be embodied through wireless (or radio) technology such as global system for mobile communication (GSM)/general packet radio service (GPRS)/ enhanced data rates for GSM evolution (EDGE). OFDMA may be embodied through wireless (or radio) technology such as institute of electrical and electronics engineers (IEEE) 802.11 (Wi-Fi), IEEE 802.16 (WiMAX), IEEE 802-20, and evolved UTRAN (E-UTRAN). UTRAN is a part of universal mobile telecommunications system (UMTS). 3rd generation partnership project (3GPP) long term evolution (LTE) is a part of E-UMTS (Evolved UMTS), which uses E-UTRAN. 3GPP LTE—Advanced (LTE-A) system is an evolved version of 3GPP LTE, and LTE-A Pro system is an evolved version of 3GPP LTE-A.

For clarity of explanations, the following description focuses on 3GPP LTE/LTE-A/LTE-A Pro system. However, technical principles of the present disclosure are not limited thereto. Further, a particular terminology is provided for better understanding of the present disclosure. However, such a particular terminology may be changed without departing from the technical principles of the present disclosure. For example, the present disclosure may be applied to a system in accordance with a 3GPP LTE/LTE-A/LTE-A Pro system as well as a system in accordance with another 3GPP standard, IEEE 802.xx standard, 3GPP2 standard, or a next-generation communication system such as 3GPP 5G or New RAT (NR).

In the present specification, a user equipment (UE) may be fixed or mobile, and may be various kinds of equipment that transmit and receive data and/or control information to communicate with a base station (BS). The UE may be referred to as a terminal, mobile station (MS), mobile terminal (MT), user terminal (UT), subscribe station (SS), wireless device, personal digital assistant (PDA), wireless modem, handheld device, etc. In the present specification, a UE may be interchangeably referred to as a terminal.

In the present specification, a base station (BS) generally refers to a fixed station that performs communication with a UE and/or another BS, and exchanges various kinds of data and control information with the UE and another BS. The base station (BS) may be referred to as an advanced base station (ABS), a node-B (NB), an evolved node-B (eNB), next generation NodeB (gNB), a base transceiver system (BTS), an access point (AP), a processing server (PS), a transmission point (TP), etc. In the present specification, a base station (BS) may be interchangeably referred to as an eNB or gNB.

In a wireless access system, a user equipment (UE) may receive information from a base station (BS) in downlink (DL) and transmit information in uplink (UL). The information transmitted or received by the UE may include data and various control information. In addition, there are various physical channels according to the type or use of the information transmitted or received by the UE.

When a UE is powered on or enters a new cell, the UE performs initial cell search. The initial cell search involves acquisition of synchronization to a base station. To this end, the UE synchronizes its timing to the base station and acquires information such as a cell identifier (ID) by receiving a primary synchronization signal (PSS) and a secondary synchronization signal (SSS) from the base station. Then the UE may acquire system information broadcasted in the cell through a physical broadcast channel (PBCH) from the base station. During the initial cell search, the UE may monitor a DL channel state by receiving a downlink reference signal (DL RS).

After the initial cell search, the UE may acquire more detailed system information by receiving a physical downlink control channel (PDCCH) and receiving a physical downlink shared channel (PDSCH) based on information of the PDCCH.

To complete access to the base station, the UE may perform a random access procedure with the base station. To this end, the UE may transmit a preamble through a physical random access channel (PRACH) and may receive a response message to the preamble through a PDCCH and a PDSCH associated with the PDCCH. In the case of a contention-based random access, the UE may additionally perform a contention resolution procedure including transmission of an additional PRACH and reception of a PDCCH signal and a PDSCH signal corresponding to the PDCCH signal.

After the above procedure, the UE may receive a PDCCH and/or a PDSCH from the base station and transmit a physical uplink shared channel (PUSCH) and/or a physical uplink control channel (PUCCH) to the base station, in a general UL/DL signal transmission procedure. Information that the UE transmits to the base station is called Uplink Control Information (UCI). The UCI includes hybrid automatic repeat and request acknowledgement/negative acknowledgement (HARQ-ACK/NACK), scheduling request (SR), channel state information (CSI), etc. The CSI includes channel quality indicator (CQI), precoding matrix indicator (PMI), rank indication (RI), etc. UCI is generally transmitted through a PUCCH periodically. However, if control information and traffic data should be transmitted simultaneously, they may be transmitted through a PUSCH. In addition, the UCI may be transmitted aperiodically through the PUSCH, upon receipt of a request/command from a network.

FIG. 1 illustrates a structure of a radio frame that may be used in the present disclosure. In a cellular orthogonal frequency division multiplexing (OFDM) radio packet communication system, uplink/downlink data packet transmission is performed in subframe units and one subframe is defined as a predetermined duration including a plurality of OFDM symbols. The LTE(-A) standard supports a type-1 radio frame structure applicable to frequency division duplex (FDD) and a type-2 radio frame structure applicable to time division duplex (TDD).

FIG. 1 illustrates the structure of the type-1 radio frame. For example, a downlink radio frame includes 10 subframes and one subframe includes two slots in a time domain. A time required to transmit one subframe is referred to as a transmission time interval (TTI). Or, TTI may refer to a time interval required to transmit one slot. For example, one subframe has a length of 1 ms and one slot has a length of 0.5 ms. One slot includes a plurality of OFDM symbols in a time domain and includes a plurality of resource blocks (RBs) in a frequency domain. In the LTE(-A) system, since OFDM is used in downlink, an OFDM symbol indicates one symbol period. The OFDM symbol may be referred to as an SC-FDMA symbol or symbol period. A resource block (RB) as a resource allocation unit may include a plurality of consecutive subcarriers in one slot.

The number of OFDM symbols included in one slot may vary according to the configuration of a cyclic prefix (CP). The CP includes an extended CP and a normal CP. For example, if OFDM symbols are configured by the normal CP, the number of OFDM symbols included in one slot may be 7. If OFDM symbols are configured by the extended CP, since the length of one OFDM symbol is increased, the number of OFDM symbols included in one slot is less than the number of OFDM symbols in case of the normal CP. In case of the extended CP, for example, the number of OFDM symbols included in one slot may be 6. In the case where a channel state is unstable, such as the case where a UE moves at a high speed, the extended CP may be used in order to further reduce inter-symbol interference.

The type-2 radio frame includes two half frames and each half frame includes five subframes, a downlink pilot time slot (DwPTS), a guard period (GP) and an uplink pilot time slot (UpPTS). One subframe includes two slots. For example, a downlink slot (e.g., DwPTS) is used for initial cell search, synchronization or channel estimation of a UE. For example, an uplink slot (e.g., UpPTS) is used for channel estimation of a base station and uplink transmission synchronization of a UE. For example, the uplink slot (e.g., UpPTS) may be used to transmit a sounding reference signal (SRS) for channel estimation in a base station and to transmit a physical random access channel (PRACH) that carriers a random access preamble for uplink transmission synchronization. The GP is used to eliminate interference generated in uplink due to multi-path delay of a downlink signal between uplink and downlink.

The above-described radio frame structures are purely exemplary, and thus the number of subframes in a radio frame, the number of slots in a subframe, or the number of symbols in a slot may vary in different ways.

Figure 2:
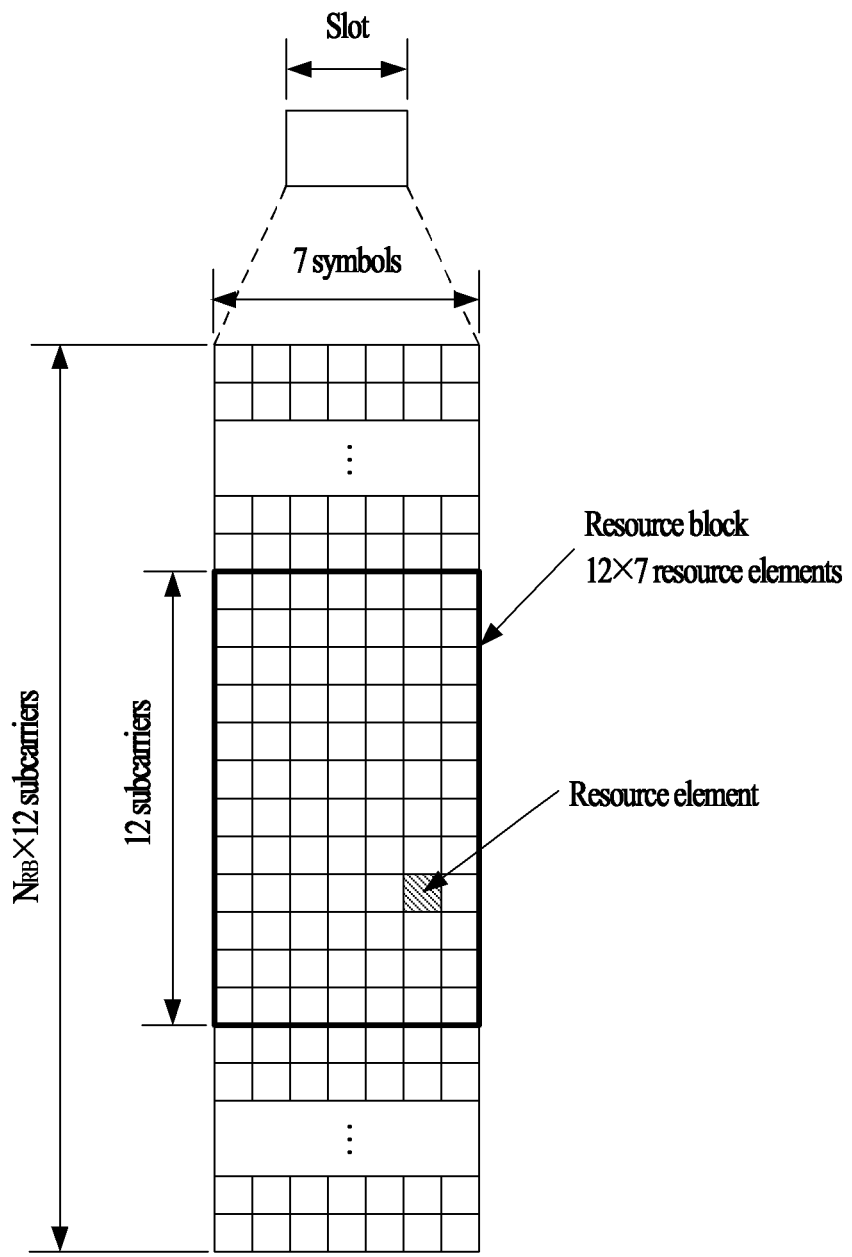
FIG. 2 illustrates a resource grid of a downlink slot that may be used in the present disclosure.

FIG. 2 illustrates a resource grid of one downlink slot that may be used in the present disclosure.

Referring to FIG. 2, a downlink slot includes a plurality of OFDM symbols in the time domain. One downlink slot may include 7 OFDM symbols and a resource block (RB) may include 12 subcarriers in the frequency domain. However, the present disclosure is not limited thereto. Each element of the resource grid is referred to as a Resource Element (RE). One RB includes 12×7 REs. The number of RBs in a DL slot, $N^{DL}$, depends on a downlink transmission bandwidth. An uplink slot may have the same structure as a downlink slot.

The above-described resource grid of a slot is exemplary, and thus the number of symbols, the number of resource elements, the number of RBs included in the slot may vary in different ways.

Figure 3:
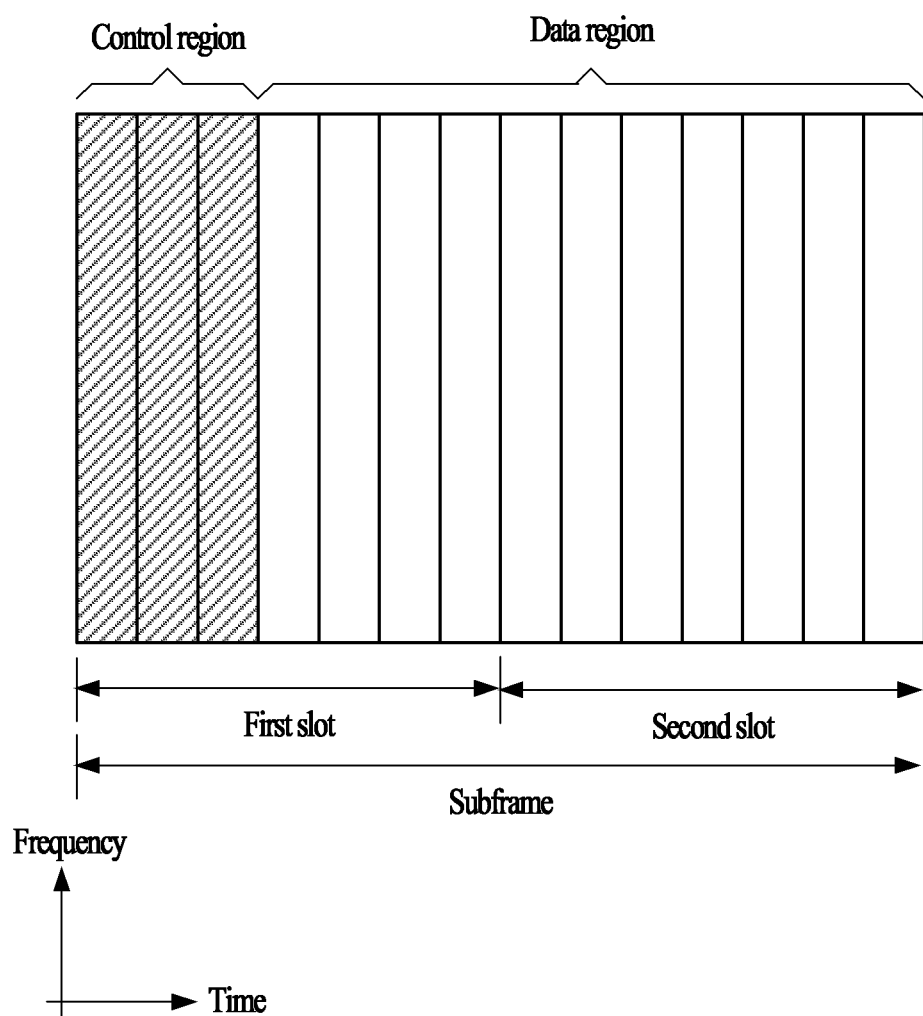
FIG. 3 illustrates a downlink subframe structure that may be used in the present disclosure.

FIG. 3 illustrates a downlink subframe structure that may be used in the present disclosure.

Referring to FIG. 3, a maximum of three (or four) OFDM symbols located in a front portion of a first slot within a subframe correspond to a control region to which a control channel is allocated. The remaining OFDM symbols correspond to a data region to which a physical downlink shared chancel (PDSCH) is allocated. A basic resource unit of the data region is RB. Examples of downlink control channels used in the LTE(-A) system include a physical control format indicator channel (PCFICH), a physical downlink control channel (PDCCH), a physical hybrid ARQ indicator channel (PHICH), etc.

PCFICH is transmitted at the first (or starting) OFDM symbol of a subframe and carries information regarding the number of OFDM symbols used for transmission of control channels within the subframe. The PCFICH is composed of four resource element groups (REGs), and each REG is uniformly distributed in a control region based on a cell ID. One REG may comprise 4 resource elements. The PCFICH indicates a value of 1 to 3 (or 2 to 4) and is modulated via quadrature phase shift keying (QPSK). The PHICH is a response of uplink transmission and carries an HARQ ACK/NACK signal. The PHICH is allocated on the remaining REGs other than CRS and PCFICH (a first OFDM symbol) in one or more OFDM symbols configured by PHICH duration. The PHICH is allocated to three REGs that are distributed if possible in the frequency domain. More detailed description regarding PHICH will be provided below in the present specification.

The PDCCH is allocated in first n OFDM symbols (hereinafter, a control region) of a subframe. Here, n is an integer equal to or greater than 1 and is indicated by the PCFICH. Control information transmitted through the PDCCH is referred to as downlink control information (DCI). A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. DCI format optionally includes information about hopping flag, RB allocation, modulation coding scheme (MCS), redundancy version (RV), new data indicator (NDI), transmit power control (TPC), cyclic shift demodulation reference signal (DM-RS), channel quality information (CQI) request, HARQ process number, transmitted precoding matrix indicator (TPMI), precoding matrix indicator (PMI) confirmation, etc. according to its usage.

The base station determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC. When the PDCCH is for uplink power control, transmit power control-RNTI (TPC-RNTI) may be used, and the TPC-RNTI may include TPC-PUCCH-RNTI for PUCCH power control and TPC-PUSCH-RNTI for PUSCH power control. When the PDCCH is for multicast control channel (MCCH), multimedia broadcast multicast service-RNTI (M-RNTI) may be used.

Control information transmitted through the PDCCH is referred to as downlink control information (DCI). Various DCI formats are defined according to their usage. Specifically, DCI format 0, 4 (hereinafter, UL grant) are defined for uplink scheduling, and DCI formats 1, 1A, 1B, 1C, 1D, 2, 2A, 2B, 2C, and 2D (hereinafter, DL grant) are defined for downlink scheduling. DCI format optionally includes information about hopping flag, RB allocation, modulation coding scheme (MC S), redundancy version (RV), new data indicator (NDI), transmit power control (TPC), cyclic shift demodulation reference signal (DM-RS), channel quality information (CQI) request, HARQ process number, transmitted precoding matrix indicator (TPMI), precoding matrix indicator (PMI) confirmation, etc. according to its usage.

The LTE(-A) system defines a limited set of CCE positions in which a PDCCH is to be positioned for each UE. A limited set of CCE positions that a UE can find a PDCCH of the UE may be referred to as a search space (SS). In the LTE(-A) system, the search space has different sizes according to each PDCCH format. In addition, a UE-specific search space and a common search space are separately defined. The base station does not provide the UE with information indicating where the PDCCH is located in the control region. Accordingly, the UE monitors a set of PDCCH candidates within the subframe and finds its own PDCCH. The term "monitoring" means that the UE attempts to decode the received PDCCHs according to respective DCI formats. The monitoring for a PDCCH in a search space is referred to as blind decoding (or blind detection). Through blind decoding, the UE simultaneously performs identification of the PDCCH transmitted to the UE and decoding of the control information transmitted through the corresponding PDCCH.

Figure 4:
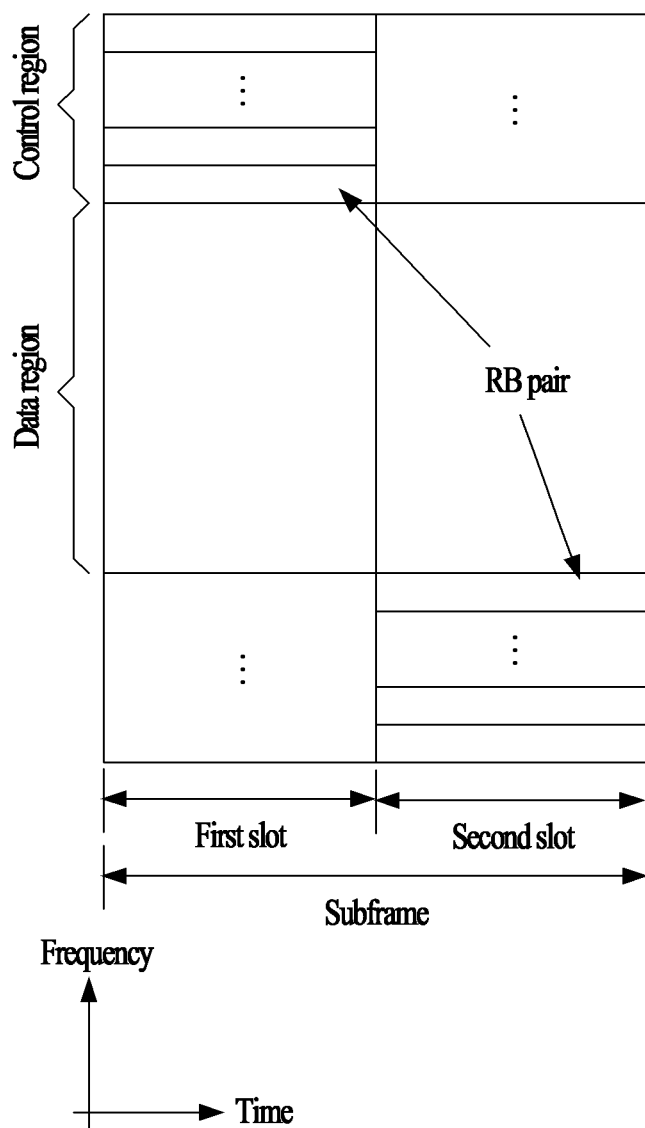
FIG. 4 illustrates an uplink subframe structure that may be used in the present disclosure.

FIG. 4 illustrates an exemplary structure of an uplink subframe that may be used in the present disclosure.

Referring to FIG. 4, the uplink subframe includes a plurality of slots (for example, two). Each slot may include a plurality of SC-FDMA symbols, wherein the number of SC-FDMA symbols included in each slot is varied depending on a cyclic prefix (CP) length. In an example, a slot may comprise 7 SC-FDMA symbols in case of normal CP. An uplink subframe is divided into a data region and a control region in a frequency domain. The data region includes a PUSCH, and is used to transmit a data signal that includes voice information. The control region includes a PUCCH, and is used to transmit uplink control information (UCI). The PUCCH includes RB pair (e.g. m=0,1,2,3) located at both ends of the data region on a frequency axis, and performs hopping on the border of the slots.

Figure 5:
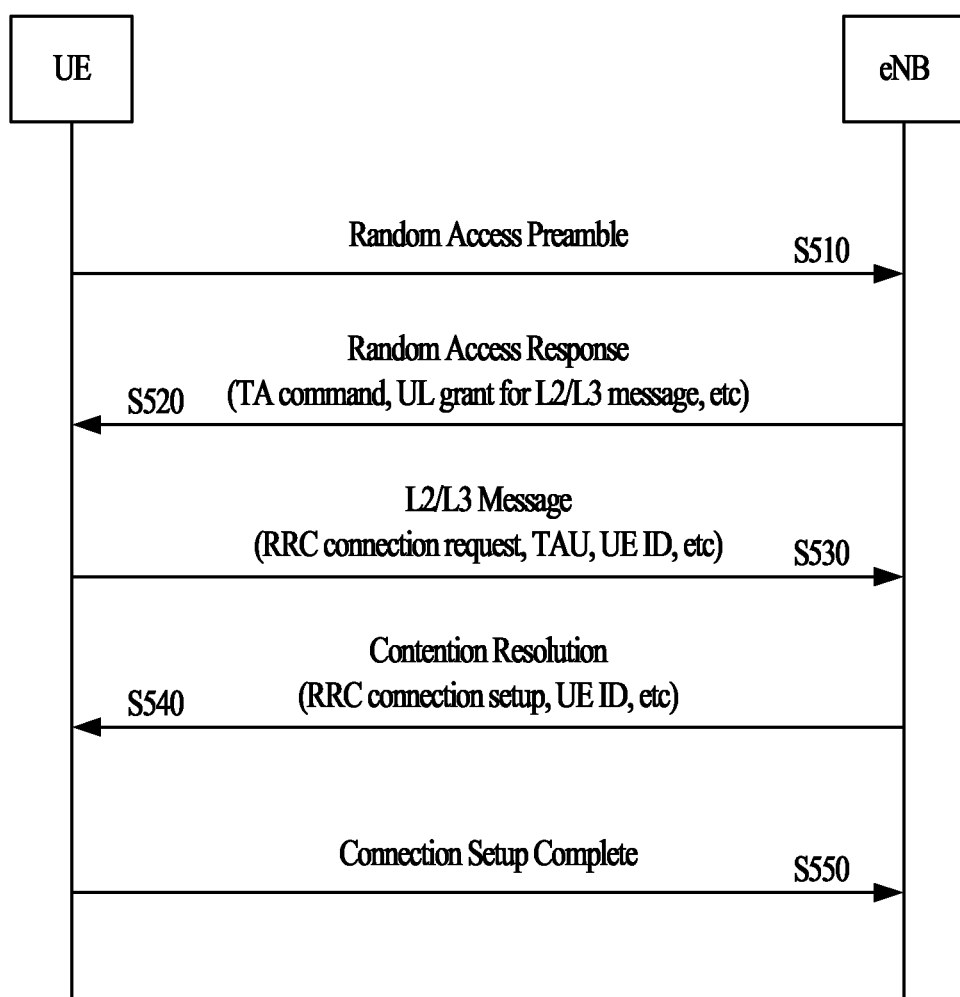
FIG. 5 illustrates a random access procedure.

FIG. 5 illustrates a random access procedure.

The random access procedure is used to transmit (short-length) data in uplink. For example, the random access procedure is performed upon initial access in an RRC IDLE state, upon initial access after radio link failure, upon handover requiring the random access procedure, and upon the occurrence of uplink/downlink data requiring the random access procedure during an RRC_CONNECTED state. Some Radio Resource Control (RRC) messages such as an RRC connection request message, a cell update message, and a URA update message are transmitted using a random access procedure. Logical channels such as a Common Control Channel (CCCH), a Dedicated Control Channel (DCCH), or a Dedicated Traffic Channel (DTCH) can be mapped to a transport channel (RACH). The transport channel (RACH) can be mapped to a physical channel (e.g., Physical Random Access Channel (PRACH)). When a UE MAC layer instructs a UE physical layer to transmit a PRACH, the UE physical layer first selects an access slot and a signature and transmits a PRACH preamble in uplink. The random access procedure is divided into a contention-based procedure and a non-contention-based procedure.

With reference to FIG. 5, a UE receives and stores information regarding random access from a base station through system information. Thereafter, when random access is needed, the UE transmits a random access preamble (referred to as Message 1 or Msg1) to the base station (S510). Upon receiving the random access preamble from the UE, the base station transmits a random access response message (referred to as Message 2 or Msg2) to the UE (S520). Specifically, downlink scheduling information for the random access response message may be CRC-masked with a Random Access-RNTI and may be transmitted through an L1/L2 control channel (PDCCH). Upon receiving the downlink scheduling signal masked with the RA-RNTI, the UE may receive and decode a random access response message from a Physical Downlink Shared Channel (PDSCH). Thereafter, the UE checks whether or not random access response information corresponding to the UE is present in the received random access response message. Whether or not random access response information corresponding to the UE is present can be determined based on whether or not a Random Access preamble ID (RAID) for the preamble that the UE has transmitted is present. The random access response information includes Timing Advance (TA) indicating timing offset information for synchronization, information of allocation of radio resources used in uplink, and a temporary identity (e.g., T-CRNTI) for user identification. Upon receiving the random access response information, the UE transmits an uplink message (referred to as Message 3 or Msg3) including an RRC connection request message through an uplink Shared Channel (SCH) according to radio resource allocation information included in the response information (S530). After receiving the uplink message from the UE, the base station transmits a message for contention resolution (referred to as Message 4 or Msg4) to the UE (S540). The message for contention resolution may be referred to as a contention resolution message, and may include an RRC connection setup message. After the UE receives the contention resolution message, the UE transmits a connection setup complete message (referred to as Message 5 or Msg5) to the base station (S550).

In case of a non-contention based procedure, a base station may allocate a non-contention random access preamble to a UE before the UE transmits a random access preamble (S510). The non-contention random access preamble may be allocated through a dedicated signaling such as a handover command or PDCCH. In case that a UE is allocated with a non-contention random access preamble, the UE may transmit the allocated non-contention random access preamble to a base station in a similar manner as S510. If the base station receives the non-contention random access preamble from the UE, the base station may transmit a random access response (referred to as Message 2) to the UE in a similar manner as S520.

During the above-described random access procedure, HARQ may not be applied to a random access response (S520), but HARQ may be applied to an uplink transmission for the random access response or a message for contention resolution. Thus, the UE does not have to transmit ACK/NACK in response the random access response.

A next generation of LTE-A system is considering to configure a user equipment (UE) at a low cost/low specification mainly focusing on data communication such as metering of a gauge meter, measurement of a water level, utilization of a monitoring camera, inventory report of a vending machine, and the like. Such a UE is to provide appropriate throughputs between connected devices even though it has a low complexity and consumes low power, and the UE is referred to as a machine type communication (MTC) UE or IoT (Internet of Things) UE for convenience, and the UE may be briefly referred to as a user equipment (UE).

Further, when the next generation system utilizes a cellular network or a third-party network, the next generation system can perform communication using a narrow band (or NB-IoT communication). For example, the narrow band may be 180 kHz. A UE (or NB-IoT UE) or an eNB transmits a single channel or a plurality of physical channels by multiplexing the channel(s) in a corresponding region. Meanwhile, the NB-IoT UE can perform communication even in such an area where channel environment is poor as under a bridge, under the sea, on the sea, and the like. In this case, in order to compensate for the poor channel environment, the NB-IoT UE may perform repetitive transmission on a specific channel (e.g., repetitive transmission during several TTIs) and/or perform power boosting. As an example of the power boosting, a region of a frequency resource to be transmitted on a specific band is more reduced to concentrate power per hour on a specific resource. For example, when a specific channel is transmitted via an RB (resource block) consisting of 12 REs, it may concentrate power to be distributed via the entire RB on a specific RE(s) by allocating the power to the specific RE instead of RE allocation in an RB unit. In particular, a scheme of performing communication by concentrating data and power on a single RE belonging to an RB is commonly referred to as a single-tone transmission scheme. NB-IoT may be interchangeably referred to as cellular IoT (cIoT).

Figure 6:
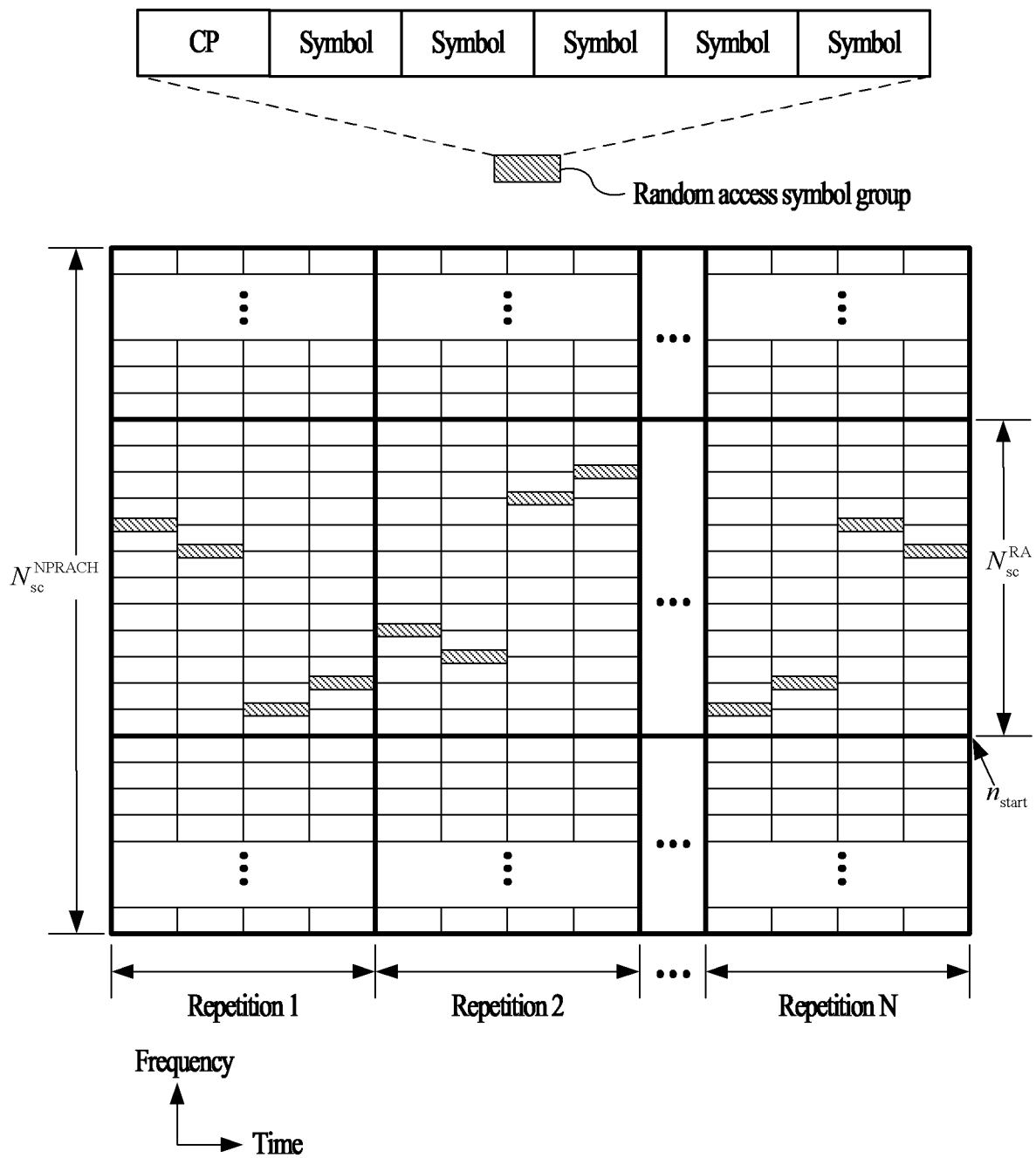
FIG. 6 illustrates an NPRACH preamble transmission method.

FIG. 6 illustrates an NPRACH preamble transmission method. The NPRACH preamble refers to a PRACH preamble for NB-IoT supported by the LTE-A Pro system and may be collectively referred to as a PRACH preamble. The random access symbol group of FIG. 6 may be referred to as an (N)PRACH symbol group, or simply as a symbol group.

The NPRACH preamble may be composed of four symbol groups (symbol group 0 to symbol group 3), and each symbol group may be composed of a cyclic prefix (CP) and a sequence part as illustrated in FIG. 6. The sequence part may consist of five subblocks, each of the subblocks including the same symbol. For example, the same symbol may have a fixed symbol value of 1.

The NPRACH preamble may be transmitted based on designated time/frequency resources. The time/frequency resources for transmission of the NPRACH preamble may be configured through NPRACH configuration information. The NPRACH configuration information may be transmitted to a user equipment through a higher layer signal (e.g., an RRC layer signal) or system information (e.g., SIB2). The NPRACH configuration information may include the following information:

Information (e.g., $N_{period}^{NPRACH}$ or nprach-Periodicity) indicating the periodicity of the NPRACH resource in the time domain;

Information (e.g., $N_{scoffset}^{NPRACH}$ or nprach-Subcarrier-Offset) indicating the first subcarrier of the NPRACH resource in the frequency domain;

Information indicating the number of subcarriers allocated to the NPRACH (e.g., $N_{sc}^{NPRACH}$ or nprach-NumSubcarriers);

Information indicating the number of start subcarriers allocated to contention-based random access (e.g., $N_{sc\_cont}^{NPRACH}$ or nprach-NumCBRA-StartSubcarriers);

Information indicating the number of NPRACH repetitions (e.g., $N_{rep}^{NPRACH}$ or numRepetitionsPerPreambleAttempt);

Information indicating an NPRACH start time (e.g., $N_{start}^{NPRACH}$ or nprach-StartTime). start In the time domain, the NPRACH preamble transmission may start at a position indicated by $N_{start}^{NPRACH}$ after the start of a radio frame that satisfies $n_f \mod(N_{period}^{NPRACH}/10)=0$.

The frequency region for transmission of the NPRACH preamble may be determined by a subcarrier offset (e.g., $N_{scoffset}^{NPRACH}$) and the number of subcarriers (e.g., $N_{sc}^{NPRACH}$) configured through a higher layer signal (e.g., an RRC layer signal) or system information (e.g., SIB2). Each symbol group constituting the NPRACH preamble is transmitted without a gap, and frequency hopping is performed in each symbol group within the designated frequency region. In frequency hopping, the frequency position of the (i+1)th symbol group (i.e., symbol group i, where i=0, 1, 2, 3) is denoted by $n_{sc}^{RA}(i)$ and may be determined by Equation 1.

$$n_{sc}^{RA}(i) = n_{start} + \tilde{n}_{SC}^{RA}(i) \quad \text{[Equation 1]}$$

In Equation 1, $n_{start}$ denotes a start subcarrier index of the NPRACH preamble and is determined by Equation 2. In Equation 1, $\tilde{n}_{SC}^{RA}(i)$ denotes a subcarrier offset and is determined by Equation 3. In Equation 2, $N_{sc}^{RA}=12$ may be given.

$$n_{start} = N_{scoffset}^{NPRACH} + \lfloor n_{init} / N_{sc}^{RA} \rfloor \cdot N_{sc}^{RA} \quad \text{[Equation 2]}$$

$$\tilde{n}_{sc}^{RA}(i) = \quad \text{[Equation 3]}$$

$$\begin{cases} (\tilde{n}_{sc}^{RA}(0) + f(i/4)) \bmod N_{sc}^{RA} & i \bmod 4 = 0 \text{ and } i > 0 \\ \tilde{n}_{sc}^{RA}(i-1) + 1 & i \bmod 4 = 1, 3 \text{ and} \\ & \tilde{n}_{sc}^{RA}(i-1) \bmod 2 = 0 \\ \tilde{n}_{sc}^{RA}(i-1) - 1 & i \bmod 4 = 1, 3 \text{ and} \\ & \tilde{n}_{sc}^{RA}(i-1) \bmod 2 = 1 \\ \tilde{n}_{sc}^{RA}(i-1) + 6 & i \bmod 4 = 2 \text{ and } \tilde{n}_{sc}^{RA}(i-1) < 6 \\ \tilde{n}_{sc}^{RA}(i-1) - 6 & i \bmod 4 = 2 \text{ and } \tilde{n}_{sc}^{RA}(i-1) \geq 6 \end{cases}$$

$$f(t) = \left( f(t-1) + \left( \sum_{n=10t+1}^{10t+9} c(n) 2^{n-(10t+1)} \right) \bmod (N_{sc}^{RA} - 1) + 1 \right) \bmod N_{sc}^{RA}$$

$$f(-1) = 0$$

In Equation 3, $\tilde{n}_{SC}^{RA}(0)$ denotes a subcarrier offset for symbol group 0 of the NPRACH preamble and is determined by Equation 4. In Equation 3, $c(n)$ is determined by Equation 5. In Equation 4, $n_{init}$ is a value selected from $\{0,1,\ldots,N_{sc}^{NPRACH}-1\}$ by a higher layer (e.g., the MAC layer).

$$\tilde{n}_{SC}^{RA}(0) = n_{init} \bmod N_{sc}^{RA} \quad \text{[Equation 4]}$$

$$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2 \quad \text{[Equation 5]}$$

In Equation 5, $N_C=1600$, and $x_1(0)=1$, $x_1(n)=0$, n=1,2, . . . , 30 may be given.

The NPRACH preamble may be repeatedly transmitted a specific number of times (e.g., N times in FIG. 6) for coverage enhancement or coverage extension. The specific number of repetitions may be configured through a higher layer signal (e.g., an RRC layer signal) or system information (e.g., SIB2). Four symbol groups constituting the NPRACH preamble (symbol group 0 to symbol group 3) are transmitted while hopping to a frequency position determined for each symbol group using Equations 1 to 5. After the first NPRACH preamble is transmitted in this way, each of the symbol groups of the second NPRACH preamble may also be transmitted through frequency hopping based on Equations 1 to 5. Using the same method, the NPRACH preamble may be repeatedly transmitted a specific number of times (e.g., N times). The frequency position of the first symbol group (i.e., symbol group 0) of each NPRACH preamble that is repeatedly transmitted may be randomly determined.

Since the symbol groups of the NPRACH preamble illustrated in FIG. 6 are transmitted without a gap, the guard time is not applied to the NPRACH preamble. Accordingly, for the NPRACH preamble illustrated in FIG. 6, a supported cell radius may be determined in consideration of the CP duration instead of the guard time. In general, the relationship between the cell radius and the round trip delay (RTD) may be represented by (Cell radius)=(Light speed)*(RTD/2), and the RTD corresponds to a guard time. Thus, the relationship between the cell radius and the CP duration may be represented by Equation 6.

(Cell radius)=(Light speed)*(CP duration/2)  [Equation 6]

Table 1 exemplarily shows approximate values of the CP duration and cell radius according to the NPRACH preamble formats. As exemplarily shown in Table 1, the NPRACH preamble formats may include formats 0 and 1. The NPRACH preamble formats may have the same sequence length and different CP durations. The CP duration may be configured through a higher layer signal (e.g., an RRC layer signal) or system information (e.g., SIB2), and the corresponding NPRACH preamble format may be determined according to the CP duration. In Table 1, 'us' denotes microseconds and 'km' denotes kilometers.

TABLE 1

| Preamble format | CP duration (us) | Sequence (us) | GT duration (us) | Max. cell radius (km) |
| --- | --- | --- | --- | --- |
| 0 | 67.5 | 1333.33 | N/A | 10.1 |
| 1 | 266.7 | 1333.33 | N/A | 40.0 |

In addition, a guard time (GT) may be given in consideration of an RTD according to the cell radius. For example, when a UE at the edge of a cell and a UE at the center of the cell transmit a PRACH preamble in the same TTI (e.g., subframe or slot), a guard time may be given to ensure that the base station can receive the PRACH preamble of each UE within the corresponding TTI. In general, since the relationship between the cell radius and the RTD may be represented by (Cell radius)=(Light speed)*(RTD/2) and the RTD corresponds to a GT, the relationship between the cell radius and the GT may be represented by Equation 7.

(Cell radius)=(Light speed)*(GT/2)  [Equation 7]

Table 2 exemplarily shows approximate values of the CP duration, GT duration, and cell radius according to the preamble formats of the legacy LTE/LTE-A system. In Table 2, the preamble format values are indicated by the PRACH configuration indexes. Preamble format 0 may be transmitted in one TTI (e.g., 1 ms), preamble formats 1 and 2 may be transmitted in two TTIs (e.g., 2 ms), and preamble format 3 may be transmitted in three TTIs (e.g., 3 ms). Here, denotes milliseconds. In Table 2, 'us' denotes microseconds and 'km' denotes kilometers.

TABLE 2

| Preamble format | CP duration (us) | GT duration (us) | Max. delay spread (us) | Max. cell radius (km) |
| --- | --- | --- | --- | --- |
| 0 | 103.1 | 96.88 | 6.3 | 14.5 |
| 1 | 684.4 | 515.6 | 16.7 | 77.3 |

TABLE 2-continued

| Preamble format | CP duration (us) | GT duration (us) | Max. delay spread (us) | Max. cell radius (km) |
|---|---|---|---|---|
| 2 | 203.1 | 196.9 | 6.3 | 29.5 |
| 3 | 684.4 | 715.6 | 16.7 | 100.2 |

As can be seen from Table 2, the maximum cell radius supported by the current LTE system is 100.2 km. Accordingly, in order to perform in-band operation using an LTE network, the UE for NB-IoT needs to support at least the same level of cell radius.

Figure 7:
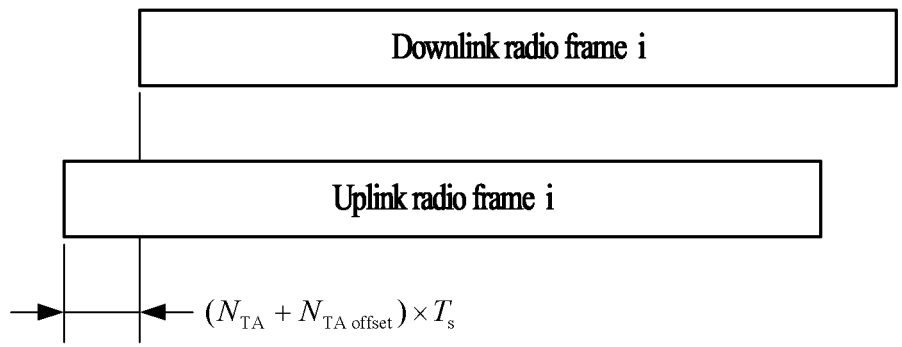
FIG. 7 illustrates an uplink-downlink timing relation.

FIG. 7 illustrates an uplink-downlink timing relation.

For uplink orthogonal transmission and reception, the base station may need to manage or adjust uplink transmission timing of each UE individually. Management or adjustment of transmission timing performed by the base station may be referred to as timing advance or timing alignment.

Timing advance or timing alignment may be performed through a random access procedure as described above. During the random access procedure, the base station may receive a random access preamble from the UE and calculate a timing advance value using the received random access preamble. The calculated timing advance value may be transmitted to the UE through a random access response, and the UE may update the signal transmission timing based on the received timing advance value. Alternatively, the base station may receive an uplink reference signal (e.g., a sounding reference signal (SRS)) that is periodically or randomly transmitted from the UE and calculate a timing advance, and the UE may update the signal transmission timing based on the calculated timing advance value.

As described above, the base station may measure the timing advance of the UE through a random access preamble or an uplink reference signal and may inform the UE of an adjustment value for timing alignment. In this case, the adjustment value for timing alignment may be referred to as a timing advance command (TAC) or a timing advance (TA) value.

Referring to FIG. 7, the transmission of uplink radio frame i from a UE may start $(N_{TA}+N_{TAoffset}) \times T_s$ seconds before the corresponding downlink radio frame starts, where $N_{TA}$ may be $0 \leq N_{TA} \leq 20512$, and $N_{TAoffset}$ may be 0 ($N_{TAoffset}=0$) for an FDD frame structure and 624 ($N_{TAoffset}=624$) for a TDD frame structure. $N_{TA}$ may be indicated by a TAC. $T_s$ denotes a sampling time. The uplink transmission timing may be adjusted in units of multiples of $16T_s$. The TAC may be given in 11 bits in the random access response and may indicate a value from 0 to 1282. $N_{TA}$ may be given as TA*16. Alternatively, the TAC may be given in 6 bits and indicate a value from 0 to 63. In this case, $N_{TA}$ may be given as $N_{TA,old}+(TA-31)*16$. The TAC received in subframe n may be applied to subframes, starting in subframe n+6.

As described above, the conventional NB-IoT system is designed based on the GSM EDGE Radio Access Network (GERAN), which supports a cell radius of 35 km, and thus the cyclic prefix (CP) of the random access preamble is designed to support only cell radius of about 40 km. However, in order to support in-band operation in the LTE network, which is one of typical deployment scenarios of the NB-IoT system, it is necessary to support a cell radius of up to 100 km. In addition, the NB-IoT system includes a mobile autonomous reporting system at a place where humans are rare, that is, where the LTE network is not well equipped, and thus it is desirable to extend the supportable cell radius.

In order to extend the maximum supportable cell radius of the random access preamble, the CP of the (NPRACH) preamble may be extended. For example, the minimum duration of the CP for supporting a cell radius of 100 km may be calculated as in Equation 8 based on Equation 6.

$$\text{CP duration (us)} = 200 \text{ km}/(3E8 \text{ m/s}) = 666.7 \text{ us} \quad \text{[Equation 8]}$$

A CP extended to support the extended cell radius as described above is referred to as an extended CP (E-CP). Additionally, the duration of the E-CP may be designed to have some margin in consideration of delay spread. In this case, a time gap having the same duration (e.g., 666.7 us) as the E-CP may be needed to avoid a case where the random access preamble received from the UE overlaps with the next adjacent subframe from the base station perspective. This time gap is referred to as a guard time (GT).

Both the CP and the GT have been added to avoid interference between symbols. In other words, since the CP and the GT are additional signals added in terms of performance, they may be classified as overhead in terms of system throughput. Therefore, to ensure more efficient preamble transmission, it may be considered to reduce the percentage overhead (% overhead) of the CP and increase a portion (e.g., symbols or symbol group portion) corresponding to the preamble information except the CP and the GT.

In addition, in order to support the cell radius extension, a timing estimation ambiguity for timing advance (TA) operation in addition to CP extension needs to be addressed. As described with reference to FIG. 7, it is necessary for a base station to individually control uplink transmission timing of each UE for uplink orthogonal transmission and reception. This process is referred to as timing advance (TA) or timing alignment. Initial timing advance is performed through a random access procedure. In the NB-IoT system, when the UE transmits a random access preamble, the base station estimates an uplink transmission delay from the received preamble and transmits the uplink transmission delay to the UE through a random access response (RAR) message in the form of a timing advance command. The UE adjusts the transmission timing using the TA command received through the RAR message.

As described with reference to FIG. 6, the random access preamble (or NPRACH preamble) for NB-IoT is transmitted in a manner of single carrier frequency hopping, and is designed considering both the timing estimation acquisition range and accuracy. The subcarrier spacing of the conventional random access preamble (or NPRACH preamble) is designed to enable timing estimation without ambiguity within a cell radius of 40 km at 3.75 kHz. When timing estimation is to be performed using the spacing between two subcarriers, a supportable cell radius without ambiguity may be calculated as follows. In estimation using the spacing between two subcarriers, the phase difference between the signals transmitted on the two subcarriers may be represented as 2*pi*delta_f, and delta_f represents the subcarrier spacing in Hz (Hertz). In addition, a phase difference between the signals transmitted on two subcarriers in consideration of a round trip delay may be represented as 2*pi*delta_f*tau RTT, where tau_RTT denotes the round trip delay. In order for the phase difference and the cell radius to have values satisfying a one-to-one correspondence relationship, 2*pi*delta_f*tau_RTT<2*pi should be satisfied. Thus, to ensure estimation without ambiguity, the relationship of tau_RTT<1/delta_f should be satisfied. The round trip distance is tau_RTT*(light speed)/2, where light speed=3E8 m/s. Accordingly, when the subcarrier spacing is 3.75 kHz, the cell radius is 1/delta_f*3E8/2=1/3.75 (kHz)*3E8 (m/s)/2=40 km. Since the cell radius within which timing estimation without ambiguity is allowed at 3.75 kHz subcarrier spacing of the legacy random access preamble (or NPRACH preamble) is 40 km, the subcarrier spacing should be narrowed to 1.5 kHz or less to support the cell radius of 100 km. Alternatively, the issue of timing estimation ambiguity may be addressed by applying fractional frequency hopping while maintaining the subcarrier spacing at 3.75 kHz, which is the same as the legacy preamble.

In brief, the cyclic prefix of the random access preamble should be extended to at least 666.7 us in order to support a cell radius of 100 km. The subcarrier spacing of the random access preamble should be narrowed to 1.5 kHz or less in order to perform timing estimation without ambiguity. Alternatively, timing estimation ambiguity should be resolved by applying fractional frequency hopping while maintaining the subcarrier spacing of 3.75 kHz.

The present disclosure is intended to enable the NB-IoT system to be used on the LTE network or a network supporting the maximum cell radius of the LTE system. Specifically, proposed herein is a method for resource allocation and frequency hopping for NB-IoT NPRACH.

For simplicity, the random access preamble supporting the extended cell radius (e.g., 100 km) as proposed in the present disclosure is defined as an "enhanced" preamble, and the conventional random access preamble is referred to as a "legacy" preamble. In the present specification, the legacy preamble may be referred to as a first preamble format, and the enhanced preamble may be referred to as a second preamble format. In the present disclosure, the terms "random access preamble," "(N)PRACH preamble," "(N)PRACH signal" and "(N)PRACH" may be used interchangeably and may be referred to simply as a preamble. In the present disclosure, the terms "PRACH symbol group" and "random access symbol group" may be used interchangeably and may be referred to simply as a symbol group. In addition, a UE supporting the conventional NB-IoT (or the legacy preamble) may be referred to as a legacy UE, and a UE supporting the enhanced preamble (or both the legacy preamble and the enhanced preamble) may be referred to as an enhanced UE.

The present disclosure is described based on a UE/base station/system supporting NB-IoT, but the present disclosure is not limited thereto. The present disclosure may be also applied to a UE/base station/system that does not support NB-IoT communication in the same manner. For example, the present disclosure may be applied not only to UEs/base stations/systems supporting massive machine type communication (mMTC) but also to typical UEs/base stations/systems (e.g., LTE/LTE-A/LTE-A Pro/5G systems and UEs/base stations operable in the systems). In the present specification, a UE/base station/system may collectively refer to a UE/base station/system supporting NB-IoT and a typical UE/base station/system not supporting NB-IoT.

Enhanced Preamble Format

In this specification, the enhanced preamble refers to a preamble designed to support a larger cell radius than the legacy preamble for NPRACH range enhancement by increasing the CP duration such that the preamble corresponds to a plurality of symbols compared to the conventional preamble, narrowing the subcarrier spacing to 3.75/N kHz (where N is an integer greater than 1), or the like. The enhanced preamble may be a new type of PRACH format added to the existing legacy preamble.

Figure 8:
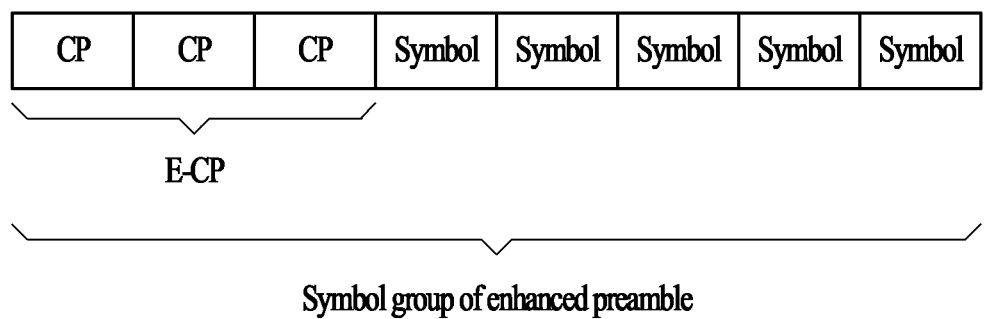
FIG. 8 illustrates an enhanced preamble according to the present disclosure.

As an example of the enhanced preamble, the number of symbols used for the CP may be increased within a symbol group constituting a random access preamble (or NPRACH preamble) for conventional NB-IoT (e.g., see FIG. 6 and related description). In the present disclosure, a CP corresponding to a plurality of symbols in a symbol group is referred to as an enhanced CP (E-CP). For example, to support an E-CP (>666.7 us), the first three symbols of the six symbols of the legacy preamble may be used as a CP and the five symbols may be used as a sequence part (e.g., see FIG. 8). In this example, the UE transmits a random access preamble in a format including a CP part corresponding to a 5-symbol duration and a sequence part corresponding to a 3-symbol duration, and the base station considers the first three symbols as an enhanced CP (E-CP), and performs preamble detection and timing estimation using the remaining five symbols other than the first three symbols. The random access preamble format of FIG. 8 is merely an example, and the present disclosure is not limited to the random access preamble format of FIG. 8.

As another example of the enhanced preamble, to support a cell radius of 100 km without ambiguity in timing estimation, the subcarrier spacing of the random access preamble (or NPRACH preamble) may be narrowed to 1.5 kHz or less. For example, the subcarrier spacing of the enhanced preamble may be set to 3.75/N kHz (where N is an integer greater than 3), taking into account additional delay spread and interference during FDM. More specifically, the subcarrier spacing may be set to 1.25 kHz (with N=3) to support up to the cell radius of 120 km. As such, by using a small subcarrier spacing for random access preamble (or NPRACH preamble) transmission, range enhancement may be achieved without ambiguity of timing estimation.

NPRACH Resource Configuration

In a system in which a legacy preamble and an enhanced preamble coexist, sharing the NPRACH resource of the legacy preamble or using the same NPRACH resource configuration method as that for the legacy preamble in transmitting the enhanced preamble may have an advantage in terms of efficient utilization of NPRACH time/frequency resources and/or backward compatibility. This section proposes a method for configuring NPRACH resources in a system that supports an enhanced preamble and a legacy preamble simultaneously.

Method 1-1 for Configuring NPRACH Resource of Enhanced UE

Method 1-1 of the present disclosure is to share a legacy NPRACH resource configuration. According to Method 1-1 of the present disclosure, the enhanced UE interprets an NPRACH resource configuration in the same way as the legacy UE and transmits an enhanced preamble therein. More specifically, assuming the legacy NPRACH resource configuration, the enhanced UE fills all the legacy NPRACH resources with the enhanced preamble, and then continues to allocate the remaining repetitions of the enhanced preamble to the legacy NPRACH resources allocated to the next periodicity. In the same way, one or more legacy NPRACH resource configurations are filled in succession until all repetitions of the enhanced preamble are allocated.

Figure 9:
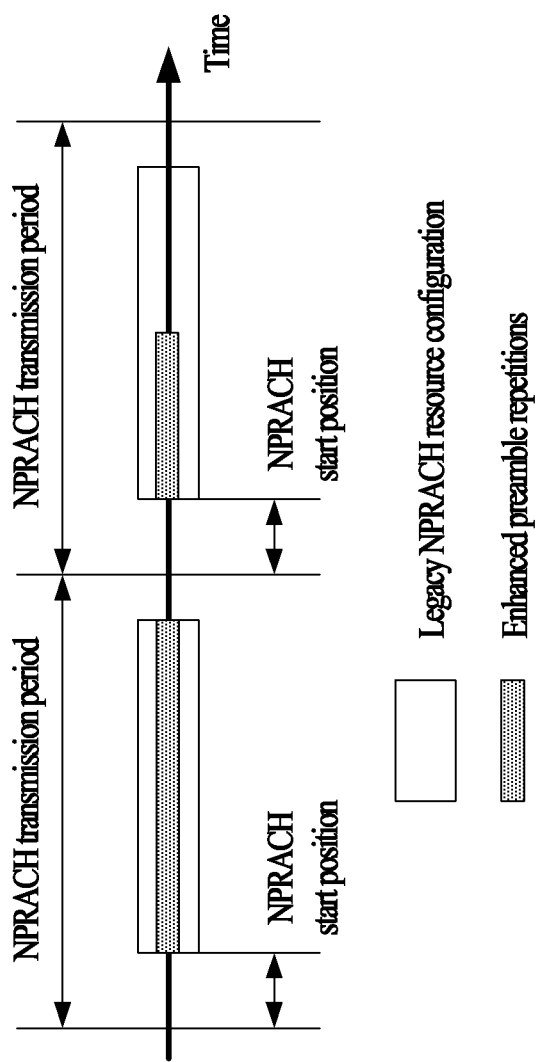
FIGS. 9 and 10 illustrate an NPRACH resource configuration method according to the present disclosure.

FIG. 9 illustrates configuring an NPRACH resource according to Method 1-1 of the present disclosure.

As described with reference to FIG. 6, an NPRACH transmission position in the time domain may be indicated through NPRACH configuration information. Specifically, the NPRACH configuration information may include information (e.g., $N_{period}^{NPRACH}$ or nprach-Periodicity) indicating the periodicity of the NPRACH resource, information indicating the number of NPRACH repetitions (e.g., $N_{rep}^{NPRACH}$ or numRepetitionsPerPreambleAttempt), and information indicating an NPRACH start time (e.g., $N_{start}^{NPRACH}$ or nprach-StartTime). In the time domain, NPRACH preamble transmission may be started at a position indicated by $N_{start}^{NPRACH}$ after the start of a radio frame that satisfies $n_f \mod(N_{period}^{NPRACH}/10)=0$. For example, when it is assumed that $N_{period}^{NPRACH}=40$ ms, $N_{start}^{NPRACH}=4$ ms, a radio frame is 10 ms, and a subframe is 1 ms (see, for example, FIG. 1), NPRACH preamble transmission may start in subframe 3 in radio frames 0, 4, 8, . . . . Accordingly, the NPRACH may be repeatedly transmitted by the number of repetitions indicated through the NPRACH configuration information at the start position indicated through the NPRACH configuration information.

Referring to FIG. 9, the enhanced preamble may have an increased CP duration compared to the legacy preamble (see, for example, FIG. 8). Accordingly, when the enhanced UE interprets/applies the legacy NPRACH resource configuration in the same manner, it may allocate repetitive transmissions of the enhanced preamble to the current NPRACH transmission period according to the NPRACH resource configuration, and then allocate the remaining repetitive transmissions to the next NPRACH transmission period. In the example of FIG. 9, the NPRACH transmission period may be indicated by information (e.g., $N_{period}^{NPRACH}$ or nprach-Periodicity) indicating the period of the NPRACH resource, and the NPRACH start position may be indicated by information (e.g., $N_{start}^{NPRACH}$ or nprach-StartTime) indicating the NPRACH start time.

The legacy NPRACH resource on which the last repetitive transmission of the enhanced preamble is performed may be fully or partially filled. When it is fully filled, the legacy NPRACH resources may be filled from the beginning of the next legacy NPRACH resource in the same manner as the legacy preamble. When the legacy NPRACH resource is partially filled, the following two methods may be considered as methods for transmitting the next enhanced preambles to be transmitted.

Method 1-1-1: Consecutive Transmission in the Same NPRACH Resource Configuration The next enhanced preambles to be transmitted may be transmitted in the same period consecutively or with a gap of a predetermined interval therebetween. Here, the gap of a predetermined period may be used for a guard time, uplink synchronization, channel sounding, or the like. When the enhanced preamble is allocated starting in the middle of the legacy NPRACH resource, the start point of the enhanced preamble should be indicated to the corresponding enhanced UE. The information indicating the start point of the enhanced preamble may have a value corresponding to a subframe index in the legacy NPRACH resource (or a value corresponding to a time offset from the start of a radio frame), or may indicate only a limited position by limiting the start point in the legacy NPRACH resource to reduce signaling overhead. The indication information may be transmitted (on the PDCCH) in the form of higher layer signaling or downlink control information (DCI). A frequency region for the next enhanced preamble to be transmitted may be configured in the same manner as the frequency region for the previously transmitted enhanced preamble.

Figure 10:
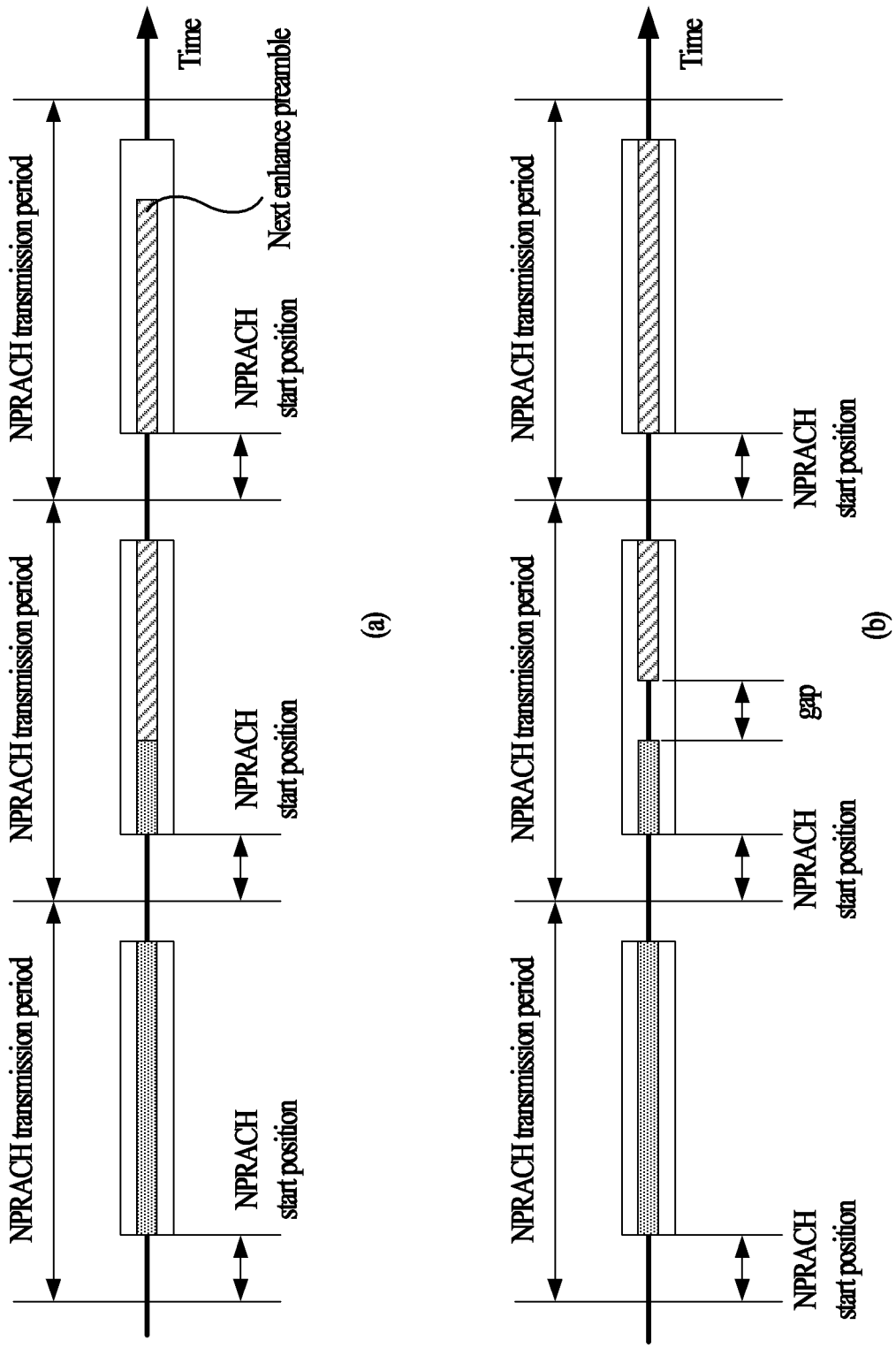

FIG. 10 illustrates transmission of an enhanced preamble according to Method 1-1-1 of the present disclosure. Referring to FIG. 10(a), transmission of the next enhanced preamble may be consecutively started immediately after the previously transmitted enhanced preamble within the same period as the transmission end position of the previously transmitted enhanced preamble. Referring to FIG. 10(b), transmission of the next enhanced preamble may be started after a gap of a predetermined interval within the same period as the transmission end position of the previously transmitted enhanced preamble.

Method 1-1-2: Limiting the Start Point of an Enhanced Preamble Repetition to a Start Point of NPRACH Resource Configuration When an enhanced preamble repetition ends in the middle of an NPRACH resource configuration, the remaining portion of the NPRACH resource in the period may be skipped and the next enhanced preamble may be transmitted from the start point of the next period or later. In this method, the start point of the enhanced preamble is limited to the start point of the legacy NPRACH resource configuration in the same manner as in the case of the legacy preamble.

Since Method 1-1 of the present disclosure conforms to the legacy NPRACH resource configuration method, it does not affect the operation of the legacy UE even when the legacy UE and the enhanced UE coexist.

Method 1-2 for Configuring NPRACH Resource

Method 1-2 of the present disclosure is to partially share a legacy NPRACH resource configuration. For example, the period and start point of the legacy NPRACH resource configuration may be shared, and the repetition may be interpreted and applied based on the enhanced preamble. As a more specific example, the transmission period and start point of the enhanced preamble may be determined based on the information (e.g., $N_{period}^{NPRACH}$ or nprach-Periodicity) indicating the period of the NPRACH resource and the information (e.g., $N_{start}^{NPRACH}$ or nprach-StartTime) indicating the NPRACH start time according to the legacy NPRACH resource configuration, respectively. The number of repetitions of the enhanced preamble may be determined by differently interpreting the information (e.g., $N_{rep}^{NPRACH}$ or numRepetitionsPerPreambleAttempt) indicating the number of NPRACH repetitions included in the legacy NPRACH resource configuration. For example, for the legacy preamble, the value indicated by $N_{rep}^{NPRACH}$ may be applied. For the enhanced preamble, the number of repetitions may be determined by adding or subtracting a specific offset to or from the value indicated by $N_{rep}^{NPRACH}$. As another example, for the enhanced preamble, the number of repetitions may be determined by multiplying or dividing a value indicated by $N_{rep}^{NPRACH}$ by a specific value.

When Method 1-2 of the present disclosure is applied, the period and start point of the enhanced preamble may be the same as those of the legacy preamble, and the end point thereof may depend on the repetition scheme of the enhanced preamble. The end point of the enhanced preamble preceding that of the legacy preamble may not cause any problem in terms of backward compatibility since there is no collision with the uplink/downlink transmission subframe of the legacy UE. However, the end point of the enhanced preamble reaching after that of the legacy preamble, a collision with the uplink/downlink transmission subframe of the legacy UE may occur. In such a situation, the legacy UE may not be expected to identify the end point of the enhanced preamble. In this case, the base station may perform scheduling using the conventional scheduling method for the legacy scheduling UE to avoid collision with the enhanced preamble.

Method 1-2 may have the following advantages over Method 1-1. In the case of Method 1-1, some common requirements may be needed for the form of time/frequency resource occupancy of the enhanced preamble to allow efficient operation. The requirements may include a requirement that the repetition units of the legacy preamble and the enhanced preamble should be identical in terms of time. For example, when the subcarrier spacing of the enhanced preamble is narrower than that of the legacy preamble, or fractional frequency hopping is applied, multiple symbols may be operated as one unit based on the symbols in the legacy preamble. In this case, a constraint may be imposed on Method 1-1.

The constraint may be preamble boundary alignment or the like, which means that the legacy preamble and the enhanced preamble are aligned to have the same duration and start point. In preamble boundary alignment, the number of symbol groups in a preamble may be adjusted, the number of symbols in a symbol group may be adjusted, or both the number of symbol groups and the number of symbols may be adjusted. While Method 1-1 may be applied according to this constraint, Method 1-2 may be applied without such a constraint on the enhanced preamble structure.

Method 1-3 for Configuring NPRACH Resource

Method 1-3 of the present disclosure is to establish an enhanced NPRACH resource configuration independently of the legacy NPRACH resource configuration. In the enhanced NPRACH resource configuration, the period, the start point, and the number of repetitions are configured independently of the legacy resource configuration. As a method for indicating the period, the start point, and the number of repetitions, the legacy NPRACH resource configuration may be used but may be interpreted differently, or an independent indication method may be defined. In order to avoid collision with the uplink/downlink transmission subframe of the legacy UE, the configuration may be allocated independently so as to fully or partially belong to the legacy NPRACH resource. Alternatively, in order to avoid collision with the legacy preamble, legacy NPRACH resources may be avoided in allocating the configuration.

When the legacy NPRACH resource configuration is used but is interpreted differently, the UE may receive the legacy NPRACH configuration information and establish a legacy NPRACH resource configuration based on values (e.g., $N_{period}^{NPRACH}$, $N_{rep}^{NPRACH}$, $N_{start}^{NPRACH}$) indicated by the legacy NPRACH configuration information. However, the enhanced NPRACH resource configuration may be established by interpreting the indicated values differently. For example, the enhanced NPRACH resource configuration may be set to values obtained by adding or subtracting a specific offset to or from the period, start point, and number of repetitions set by the legacy NPRACH resource configuration. As another example, the enhanced NPRACH resource configuration may be set to values obtained by multiplying or dividing the period, start point, and number of repetitions set by the legacy NPRACH resource configuration by a specific value. In this case, the base station does not transmit the enhanced NPRACH configuration information to the UE, and the UE does not receive the enhanced NPRACH configuration information.

When an independent indication method is defined and used, the UE may receive enhanced NPRACH configuration information along with the legacy NPRACH configuration information. The UE may establish a legacy NPRACH resource configuration based on values (e.g., $N_{period}^{NPRACH}$, $N_{rep}^{NPRACH}$, $N_{start}^{NPRACH}$) indicated by the legacy NPRACH configuration information, and establish a legacy NPRACH resource configuration based on values (e.g., $N_{period}^{NPRACH}$, $N_{rep}^{NPRACH}$, $N_{start}^{NPRACH}$) indicated by the enhanced NPRACH configuration information. When independent NPRACH resource configurations are established for the enhanced preamble and the legacy preamble, the resource configurations may be established so as to avoid collision between the enhanced preamble and the legacy preamble.

Method 1-4 for Configuring NPRACH Resource

The NPRACH resource configuration of the enhanced preamble may be transmitted in a manner of FDM with the legacy NPRACH resource configuration. For the legacy preamble, a part of 1 Resource Block (RB) (=15 kHz/subcarrier*12 subcarriers/RB=180 kHz/RB) is allocated to legacy preamble transmission based on the LTE subcarrier spacing of 15 kHz. In order to perform FDM on the enhanced preamble and the legacy preamble, the base station may allocate a portion of the frequency region of 180 kHz (or 1 RB) as NPRACH resources for legacy preamble transmission, and allocate the remaining portion or a part of the remaining portion as NPRACH resources for enhanced preamble transmission.

According to Method 1-4 of the present disclosure, the legacy UE may be operated without being affected by the FDM with the enhanced preamble because the legacy UE is allocated a certain frequency region by the same NPRACH resource configuration method as in the conventional cases. The enhanced preamble may perform repetition and/or frequency hopping in all or some regions of the allocated NPRACH resource in the same manner as the legacy preamble.

Hereinafter, a resource configuration method for the enhanced preamble or enhanced NPRACH will be described in more detail.

Method 2-1: Configuring Frequency Resource of Enhanced Preamble or Enhanced NPRACH The spacing of a frequency grid selectable for a starting frequency (or tone) position within a frequency resource of the enhanced preamble or an NPRACH resource of the enhanced preamble may be configured to be the same as the frequency resource spacing of the legacy NPRACH or the frequency grid spacing (e.g., 3.75 kHz) selectable as the starting frequency (or tone) position within the NPRACH resource of the legacy preamble.

Alternatively, the frequency grid spacing selectable for the starting frequency (or tone) position within the frequency resource of the enhanced preamble or the NPRACH resource of the enhanced preamble may be configured to be the same as the subcarrier spacing or minimum hop distance of the enhanced preamble (e.g., 1.25 kHz).

When an enhanced UE (or a UE supporting the enhanced preamble) transmits or is configured to transmit an enhanced preamble in a legacy NPRACH contention-based region, the frequency grid selectable for the starting frequency (or tone) position within the enhanced NPRACH frequency resource or the NPRACH resource of the enhanced preamble may be configured at the same spacing (e.g. 3.75 kHz) as the frequency grid selectable for the starting frequency (or tone) within the frequency resource of the legacy NPRACH or the NPRACH resource of the legacy preamble in order to avoid collision with the legacy preamble or to minimize interference therewith. Alternatively, the frequency grid selectable for the starting frequency (or tone) position within the enhanced NPRACH frequency resource or the NPRACH resource of the enhanced preamble may be configured at the same position as the frequency grid selectable for the starting frequency (or tone) within the frequency resource of the legacy NPRACH or the NPRACH resource of the legacy preamble, and a specific frequency offset (e.g., a frequency offset of +delta kHz or −delta kHz) (from the frequency grid selectable for the starting frequency (or tone) position within the frequency resource of the legacy NPRACH or the NPRACH resource of the legacy preamble) may be configured. For example, the magnitude (e.g., delta value) of the specific frequency offset may be configured to be equal to the subcarrier spacing or minimum hop distance (e.g., 1.25 kHz) of the enhanced preamble.

When the enhanced UE transmits or is configured to transmit an enhanced preamble in a legacy NPRACH contention-free region, in order to support extension of NPRACH frequency resource or random access of more enhanced UEs, a frequency grid spacing selectable for the starting frequency (or tone) position within the enhanced NPRACH resource or the NPRACH resource of the enhanced preamble may be configured to be narrower than the frequency spacing selectable for the starting frequency (or tone) position within the legacy NPRACH resource or the NPRACH resource of the legacy preamble. For example, the frequency grid spacing selectable for the starting frequency (or tone) position within the enhanced NPRACH resource or the NPRACH resource of the enhanced preamble may be configured to be equal to the subcarrier spacing or minimum hop distance (e.g., 1.25 kHz) of the enhanced preamble.

Method 2-2: Frequency Offset of Enhanced Preamble or Enhanced NPRACH

A frequency grid selectable for a starting frequency (or tone) position within a frequency resource of an enhanced preamble or an NPRACH resource of the enhanced preamble may be configured to have a specific frequency offset (e.g., a frequency offset of +delta kHz or −delta kHz) from a frequency grid (e.g., 3.75 kHz) selectable for the starting frequency (or tone) position within the frequency resource of the legacy (or enhanced) preamble or the NPRACH resource of the legacy (or enhanced) preamble. For example, the magnitude of the frequency offset value (e.g., the delta value) may be set to be equal to the subcarrier spacing or minimum hop distance (e.g., 1.25 kHz) of the enhanced preamble.

The frequency offset of the enhanced preamble or enhanced NPRACH may be cell-specifically configured such that all UEs in the same cell have the same frequency offset. Alternatively, it may be configured in operative connection with the transmission start time of the enhanced preamble or the enhanced NPRACH time resource such that all UEs having the same transmission time point or the same NPRACH time resource have the same frequency offset. Alternatively, the same frequency offset value may be given when one of the two conditions (e.g., being present in the same cell or having the same transmission time or the same NPRACH time resource) is satisfied or only when both conditions are satisfied. For example, in the latter case, the same frequency offset value may be set for all UEs sharing an enhanced preamble start time or enhanced NPRACH time resource in the same cell.

Method 2-3: Configuring RAPID of Enhanced Preamble or Enhanced NPRACH

In order to distinguish a preamble or NPRACH according to selection of a starting frequency (tone) within a frequency resource or an NPRACH resource in enhanced preamble or enhanced NPRACH transmission, a Random Access Preamble ID (RAPID) may be distinguished by each selectable starting frequency (tone) within the frequency resource or the NPRACH resource. The RAPID of the enhanced preamble or NPRACH may be configured by (consecutively) allocating indexes in ascending or descending order of frequency values at intervals of the subcarrier spacing or minimum hop distance (e.g., 1.25 kHz) of the preamble for the entire NB-IoT system bandwidth or for a specific frequency region (where preamble transmission or NPRACH frequency resource is configurable) (RAPID configuration method 2-3-1).

Alternatively, it may be configured by allocating indexes only at frequency positions actually used for preamble transmission or NPRACH frequency resource configuration within the system bandwidth or in a frequency region in which the preamble transmission or NPRACH frequency resource configuration is allowed (RAPID configuration method 2-3-2). Accordingly, a set of frequency positions assigned an ID by RAPID configuration method 2-3-2 may be a subset of the set of frequency positions assigned an ID by RAPID configuration method 2-3-1.

In a system supporting both the enhanced preamble and the legacy preamble, RAPIDs may be allocated to frequency resources of the legacy preamble or NPRACH in ascending or descending order of frequency values, and then the remaining portion thereof may be allocated to the enhanced preamble in ascending or descending order of frequency values. For example, when the range of the RAPID is 0 to N−1 (e.g., N=64), and the number of frequency resources of the legacy preamble is M (e.g., M=48), 0 to M−1 may be allocated to starting frequencies (tones) selectable within the NPRACH resource in ascending or descending order of frequency values for frequency resource or preamble transmission of the legacy preamble or NPRACH, and M to N−1 may be allocated to starting frequencies (tones) selectable within the NPRACH resource in ascending or descending order of frequency values for frequency resource or preamble transmission of the enhanced preamble or NPRACH.

In a system supporting both enhanced preamble and legacy preamble, the RAPID configuration method may be configured differently according to the region of NPRACH frequency resources. For example, the NPRACH frequency resource (or frequency grid) spacing, NPRACH frequency offset, and the like may differ between a case where the enhanced preamble is transmitted in a legacy NPRACH contention-based region and a case where the enhanced preamble is transmitted in a legacy NPRACH contention-free region.

Moreover, the RAPID configuration method may be configured differently depending on whether the enhanced preamble and the legacy preamble use the same RA-RNTI. For example, when the same RA-RNTI is not used, the RAPID of the enhanced preamble may be defined by sequentially assigning values, starting with 0, to starting frequencies (tones). On the other hand, when the same RA-RNTI is shared, in order to distinguish the enhanced preamble from the legacy preamble, the RA-RNTI may be sequentially assigned to starting frequencies (tones) at which the enhanced preamble may be transmitted after a specific value (offset). The specific value or offset may be the greatest value among all RAPID values available for any legacy preamble.

For example, for the legacy UE (or the legacy preamble), the RA-RNTI may be determined based on index information about the first (or starting) radio frame in which repeated transmission of the random access preamble starts. As a specific example, the legacy UE may determine the RA-RNTI based on Equation 9. In Equation 9, SFN_id denotes index information about the first (or starting) radio frame in which repeated transmission of the random access preamble starts, and floor( ) denotes a floor function that rounds a number to the nearest integer.

$$RA\text{-}RNTI=1+floor(SFN\_id/4) \qquad [\text{Equation 9}]$$

In addition, in a system supporting both the enhanced preamble and the legacy preamble, an enhanced UE may differently interpret a frequency offset (compared to the legacy preamble or the 3.75 kHz frequency grid of the enhanced preamble), frequency hopping pattern or hopping direction, and the like for enhanced preamble transmission according to a transmission region of the enhanced preamble or an NPRACH frequency resource region and apply the same to enhanced preamble or enhanced NPRACH transmission.

Method 2-4: Configuring Time Resource of Enhanced Preamble or Enhanced NPRACH

To support time resource sharing between the enhanced preamble or enhanced NPRACH and the legacy preamble or legacy NPRACH, the preamble boundary of the enhanced preamble (in the time domain) may be configured to be aligned with the preamble boundary (in the time domain) of $N=2^n$ (where n is a positive integer) repetitions of the legacy preamble (wherein ^ denotes a power). That is, the duration of the enhanced preamble may be configured to be $N=2^n$ (where n is a positive integer) times that of the legacy preamble, and the start point of the enhanced preamble may be configured to be aligned with the legacy preamble. For example, when the duration of one enhanced preamble symbol is three times the duration of one legacy preamble symbol, one symbol group may be configured with 4 symbols and the preamble may be configured with 4 symbol groups such that the duration of the enhanced preamble is twice ($2^{\wedge}=2$) the duration of the legacy preamble. Alternatively, one symbol group may be configured with 8 symbols and the preamble may be configured with 4 symbol groups such that the duration of the enhanced preamble is $2^{\wedge}2=4$ times the duration of the legacy preamble.

Random Access Procedure

The random access procedure of the enhanced UE may employ a 4-step contention-based random access procedure as in the case of the legacy UE (see, for example, FIG. 5 and related description). The general contention-based random access procedure and a conventional transmission message at each step thereof are given as follows.

1) Msg1: RA preamble transmission (see, for example, S510 of FIG. 5)

2) Msg2: RAR (TA command, UL grant for L2/L3 message, etc.) (see, for example, S520 of FIG. 5)

3) Msg3: L2/L3 message (RRC connection request, TAU, UE id, etc.) (see, for example, S530 of FIG. 5)

4) Msg4: Contention resolution message (RRC connection setup, UE id, etc.) (e.g., see S540 of FIG. 5)

5) Msg5: RRC connection setup complete (e.g., refer to S550 of FIG. 5)

In the Msg1 step, an enhanced preamble is transmitted through an NPRACH resource for the enhanced preamble. The base station calculates the TA information and the RA-RNTI based on the received enhanced preamble. In the Msg2 step, the base station transmits a message (RAR) including a TA command and msg3 scheduling information to the UE. The UE receives RAR information intended therefor using RA-RNTI in a common search space. The RA-RNTI is calculated based on the preamble transmission start point and may have a value pre-known to the UE. The UE applies timing adjustment to msg3 according to the msg3 scheduling information and the TA command received in the msg2 step and transmits msg3 on uplink. Msg3 includes UE identification information (or UE id information) for contention resolution. When the base station successfully receives msg3, the base station transmits a contention resolution message including UE identification information (or UE id information) on downlink in the msg4 step. When the UE confirms UE identification information (or UE id information) thereon included in the contention resolution message in the msg4 step, the UE determines that contention resolution is completed. When the enhanced preamble shares a NPRACH resource with the legacy preamble, the enhanced preamble may be transmitted over multiple legacy NPRACH resources. In this case, an ambiguity issue may be raised regarding the NPRACH resource position where the enhanced preamble starts. This section proposes a solution to such an ambiguity issue.

Method 3-1: Solution 1 to Ambiguity of Transmission Start Point of Enhanced Preamble In Method 3-1 of the disclosure discloses, a period in which enhanced preamble transmission may be started among configured NPRACH resources is indicated to the base station to address the ambiguity issue that may occur when an enhanced preamble is transmitted over multiple legacy NPRACH resource periods. For the indication, resource period index i may be defined as a counter value that is incremented by 1 for each NPRACH period. Resource period index i has a value of i=0 in a period including SFN=O as a reference value. For example, when one enhanced preamble is allocated across N legacy NPRACH resources, the base station may impose an constraint such that enhanced preamble transmission is started only within an NPRACH resource period corresponding to NPRACH resource period index i=k (k=0 to N-1), and may indicate information corresponding to the value of k to the UE. The UE repeatedly transmits the enhanced preamble only in the NPRACH resources within the NPRACH resource period corresponding to (i mod N)=k. Here, 'mod' represents a modulo function. The value of k indicated by the base station may be transmitted together with NPRACH resource configuration information about the enhanced UE through higher layer signaling (e.g., RRC signaling), or may be transmitted to the UE in the form of DCI (on a PDCCH).

Method 3-1: Solution 2 to Ambiguity of Transmission Start Point of Enhanced Preamble Alternatively, in order to reduce signaling overhead, the start point of the enhanced preamble may be limited and specified in the specification. For example, the start point of the enhanced preamble may be limited such that (i mod N)=k. Here, 'mod' represents a modulo function. For example, when N=2 and k=0, the enhanced preamble is started only in the NPRACH resource periods corresponding to NPRACH resource period index i=0, 2, 4, 8, .... When N is a fraction, for example, N=5/3, the enhanced preamble may be limited such that the enhanced preamble transmission is started only at i that satisfies (i mod ceil(N))=k.

As described above, since the RA-RNTI may be a value calculated based on a preamble transmission start point, both the value thereof may be known to both the base station and the UE by calculation. However, when the legacy UE and the enhanced UE share the start point of NPRACH resources, the following operation may be considered in the case where the RA-RNTI values corresponding to the legacy preamble and the enhanced preamble are the same and thus are not distinguished from each other.

Method 4-1: Response to a Case where the Legacy Preamble and the Enhanced Preamble have the same RA-RNTI When the enhanced preamble has the same RA-RNTI as the legacy preamble as the preamble transmission start points of the preambles are the same, the UE may rely on the contention resolution process of the contention-based random access procedure as a first method. When the UE receives the RA-RNTI of the preamble thereof, the UE may transmit UE identification information (or UE id) on uplink according to the msg3 scheduling information included in the RAR message and receive UE identification information (or UE id) thereon at msg4. Thereby, contention resolution may be completed. In Method 4-1, enhanced preamble transmission may not be confirmed until the msg4 step. Considering the importance of power consumption and latency reduction in NB-IoT, the following method by which enhanced preamble transmission may be confirmed before msg4 may be considered.

Method 4-2: Response to a Case where the Legacy Preamble and the Enhanced Preamble have the same RA-RNTI As a second method, a field indicating whether a preamble is an enhanced preamble or legacy preamble may be added to an RAR message. Alternatively, a flag for distinguishing between an enhanced preamble and a legacy preamble may be transmitted in a reserved field of the RAR message. For example, in the case of RAR corresponding to the legacy preamble, the enhanced UE may reduce power consumption or delay by performing retransmission or next operation before the msg4 step based on the aforementioned information.

Method 4-3: Response to a Case Where the Legacy Preamble and the Enhanced Preamble have the same RA-RNTI As a third method, RA-RNTI for the enhanced preamble distinguished from that for legacy preamble may be added. The RA-RNTI for the enhanced preamble (hereinafter referred to as e-RA-RNTI for simplicity) may be the sum of a legacy RA-RNTI (see, for example, Equation 9 and related description) and an offset as follows.

e-RA-RNTI=RA-RNTI+Offset

The offset for distinguishing the e-RA-RNTI may be a great value that does not cause confusion with the legacy RA-RNTI. For example, the offset may be 512, which corresponds to half of the system frame number. For the e-RA-RNTI, a specific bit or bits, such as the most significant bit (MSB) of the legacy RA-RNTI, may be used in a reversed form. The offset may be a fixed value, a value semi-statically set by higher layer signaling (e.g., RRC signaling), or a value dynamically signaled by DCI or the like (on the PDCCH).

The offset may be a value determined considering the number of repetitions of the preamble. For example, the offset value may be set such that the e-RA-RNTI is calculated based on a point other than the start point of preamble transmission (e.g., the end point of the transmission). In this case, the specification may specify that the e-RA-RNTI value is calculated based on a point other than the start point of the preamble transmission (e.g., the end point of the preamble transmission).

Method 4-4: Response to a Case Where the Legacy Preamble and the Enhanced Preamble have the same RA-RNTI As a fourth method, the method for calculating the e-RA-RNTI in Method 4-3 may be applied to both the RA-RNTI for legacy preamble and the e-RA-RNTI for the enhanced preamble. In this case, as the offset, the same value may be used for the RA-RNTI and the e-RA-RNTI, or different values without confusion may be applied.

Method 5: Reducing Power and Delay in RA Procedure through Multiple Random Access Response (RAR) Windows When an enhanced preamble is transmitted over multiple legacy NPRACH resource periods, an RAR message may be transmitted and received after the NPRACH resource of the last period. However, setting the NPRACH resource period to be long to increase the data transmission throughput may excessively increase the delay and be disadvantageous in terms of power consumption. In order to address this issue, an RAR window may be configured in which an RAR message may be additionally transmitted before the last period.

For example, Method 5 may include transmitting a RAR message by configuring an RAR window in every NPRACH resource period. When the base station receives the enhanced preamble before N NPRACH resource periods, the base station transmits the corresponding RAR information to the UE using the RAR window within the corresponding period. When the UE checks the RA-RNTI by checking the RAR window in every period, the UE may determine whether the preamble transmission thereof is successful by checking the RAR message, and then perform the next steps, such as msg3 transmission. When the RA procedure is completed before the NPRACH resource of the next period, the UE may stop NPRACH transmission of the next period. Alternatively, when the NPRACH of the next period is reached before the RA procedure is completed, the RA procedure may be continued, or the NPRACH transmission of the period may be continued with the RA procedure dropped or postponed. When the RA procedure is postponed, the RA procedure may be continued after completing the NPRACH transmission of the period.

An RA-RNTI used for a multiple RAR window may be calculated based on the NPRACH for initial transmission of the enhanced preamble, or may be calculated based on the start point of the corresponding NPRACH period. Alternatively, every RA-RNTI of the multiple RAR windows may be distinguishably used to distinguish the RA-RNTI in the multiple RAR window. For example, the RA-RNTI of the multiple RAR window may include an NPRACH resource period index value or information by which the value may be inferred.

Figure 11:
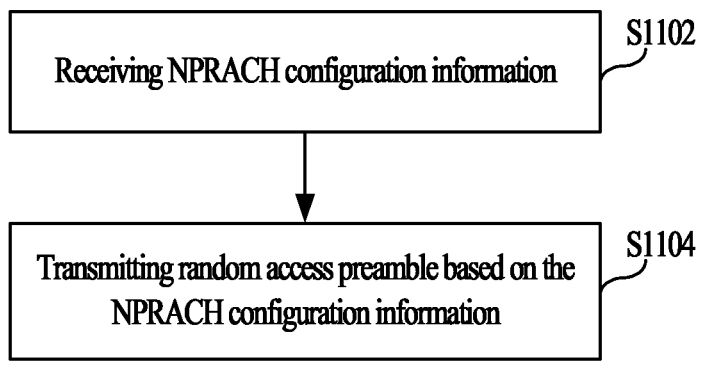
FIG. 11 illustrates a flowchart of a method for performing a random access procedure according to the present disclosure.

FIG. 11 illustrates a flowchart of a method for performing a random access procedure according to the present disclosure. For simplicity, the following description will be based on the UE, but a corresponding operation may be performed by the base station.

Referring to FIG. 11, in operation S1102, the UE receives NPRACH configuration information. The UE may configure a resource for random access preamble transmission according to a preamble format indicated by the NPRACH configuration information between a first preamble format and a second preamble format. Alternatively, in operation S1102, the UE may receive first NPRACH configuration information indicating a resource configuration for a legacy preamble format and receive second NPRACH configuration information indicating a resource configuration for an enhanced preamble format. In this case, the UE may configure a resource for the legacy preamble format according to the first NPRACH configuration information, and configure a resource for the enhanced preamble format according to the second NPRACH configuration information.

In operation S1102, the UE may configure a resource for random access preamble transmission according to Method 1-1 or Method 1-2. Alternatively, in operation S1102, the UE may configure a resource for random access preamble transmission according to Method 1-3 or Method 1-4.

In operation S1102, as a specific resource configuration method, Methods 2-1 to 2-4 according to the present disclosure may be applied in combination with or independently of Methods 1-1 to 1-4.

For example, one symbol length for the enhanced preamble format may correspond to three times the duration of one symbol for the legacy preamble format (see, for example, Method 2-4). Frequency grid spacing for the legacy preamble format may be set to 3.75 kHz and frequency grid spacing for the enhanced preamble format may be set to 1.25 kHz (see, for example, Method 2-1). The present disclosure is not limited to this example. Methods 2-1 to 2-4 may be applied to the present disclosure in combination with or independently of Methods 1-1 to 1-4.

In operation S1104, the UE may transmit a random access preamble based on the received NPRACH configuration information. More specifically, the UE may transmit a random access preamble according to a preamble format indicated by the NPRACH configuration information between the first preamble format and the second preamble format.

Alternatively, in the case where the first NPRACH configuration information and the second NPRACH configuration information are received, the UE may transmit the random access preamble according to the first NPRACH configuration information when the UE supports the legacy preamble format. The UE may transmit the random access preamble according to the second NPRACH configuration information when the UE supports the enhanced preamble format. Alternatively, when the UE does not support the enhanced preamble (or the UE is a legacy UE), the random access preamble may be transmitted in the legacy preamble format based on the first NPRACH configuration information. When the UE supports the enhanced preamble (or the UE is an enhanced UE), the random access preamble may be transmitted in the enhanced preamble format based on the second NPRACH configuration information.

In operation S1104, Method 3-1 or Method 3-2 according to the present disclosure may be applied in transmitting the random access preamble to address the issue of ambiguity of the transmission start point of the enhanced preamble.

Although not shown in FIG. 11, the UE may receive an RAR in response to the random access preamble. Specifically, the UE may detect DCI for RAR reception, using the RA-RNTI. Methods 4-1 to 4-4 according to the present disclosure may be applied in case that the legacy preamble and the enhanced preamble have the same RA-RNTI.

Additionally or separately, Method 5 according to the present disclosure may be applied in order to reduce the power and delay in the RA procedure.

Figure 12:
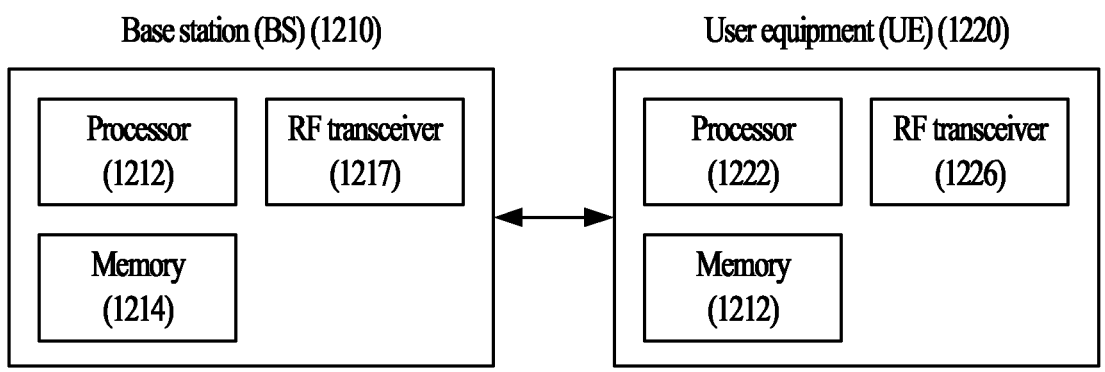
FIG. 12 illustrates a base station and a UE to which the present disclosure is applicable.

FIG. 12 illustrates a base station and a UE to which the present disclosure is applicable.

Referring to FIG. 12, a wireless communication system includes a base station (BS) 1210 and a user equipment (UE) 1220. If the wireless communication system includes a relay, the BS or the UE may be replaced with the relay.

The BS 1210 includes a processor 1212, a memory 1214, and a radio frequency (RF) transceiver 1216. The processor 1212 may be configured to implement the procedures and/or methods proposed in the present disclosure. The memory 1214 is connected to the processor 1212 and stores various kinds of information related to the operation of the processor 1212. The RF transceiver 1216 is connected to the processor 1212 and transmits and/or receives wireless signals. The UE 1220 includes a processor 1222, a memory 1212, and an RF transceiver 1226. The processor 1222 may be configured to implement the procedures and/or methods proposed in the present disclosure. The memory 1212 is connected to the processor 1222 and stores various kinds of information related to the operation of the processor 1222. The RF transceiver 1226 is connected to processor 1222 and transmits and/or receives wireless signals.

The above-described embodiments are combinations of the elements and features of the present disclosure in a predetermined form. Each element or feature is to be considered optional unless stated otherwise. Each element or feature may be embodied without being combined with other elements or features. It is also possible to combine some of the elements and/or features to form an embodiment of the disclosure. The order of the operations described in the embodiments of the disclosure may be changed. Some elements or features of one embodiment may be included in another embodiment or may be replaced with corresponding elements or features of another embodiment. It is apparent to those skilled in the art that claims that are not explicitly cited in each other in the appended claims may be presented in combination as an embodiment of the present disclosure or included as a new claim by a subsequent amendment after the application is filed.

A specific operation described as being performed by the BS may be performed by an upper node of the BS. Namely, it is apparent that, in a network comprised of a plurality of network nodes including a BS, various operations performed for communication with a UE may be performed by the BS, or network nodes other than the BS.

The embodiments of the present disclosure may be implemented by various means, for example, hardware, firmware, software, or a combination thereof. In a hardware implementation, an embodiment of the present disclosure may be implemented by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software implementation, methods according to the present disclosure may be implemented in the form of a module, a procedure, a function, etc which are configured to perform the functions or operations as described in the present specification. Software code may be stored in a computer-readable medium in the form of instructions and/or data and may be executed by a processor. The computer-readable medium is located at the interior or exterior of the processor and may transmit and receive data to and from the processor via various known means.

It will be apparent to those skilled in the art that various modifications and variations can be made in the present disclosure without departing from the scope of the invention. Thus, it is intended that the present disclosure cover the modifications and variations of this invention provided they come within the scope of the appended claims and their equivalents.

The present disclosure is applicable to a wireless communication apparatus such as a user equipment, a base station, etc.

What is claimed is:

1. A method for performing, by a terminal, a random access procedure in a wireless communication system supporting a first preamble format and a second preamble format, the method comprising:
   receiving physical random access channel (PRACH) configuration information; and
   transmitting a random access preamble having the second preamble format, based on the second preamble format being indicated by the PRACH configuration information among the first preamble format and the second preamble format,
   monitoring a random access response (RAR) message for the random access preamble transmission based on a plurality of RAR windows, and
   transmitting an uplink message based on a detection of the RAR message,
   wherein 'N' number of PRACH resource periods are configured for the terminal to perform the random access preamble transmission 'N' number of times, where 'N' is an integer greater than 1,
   wherein at least one RAR window among the plurality of RAR windows is located prior to a last PRACH resource period among the 'N' number of PRACH resource periods, and
   wherein based on the RAR message being detected from the at least one RAR window that is located prior to the last PRACH resource period, the terminal is allowed to early transmit the uplink message without completion of the 'N' number of the random access preamble transmissions.

2. The method of claim 1, wherein one symbol length of the second preamble format corresponds to three times one symbol length of the first preamble format,
   wherein the first preamble format has a frequency grid spacing of 3.75 kHz and the second preamble format has a frequency grid spacing of 1.25 kHz, and
   wherein a resource configuration for the first preamble format and a resource configuration for the second preamble format are Frequency Division Multiplexed (FDMed) in a frequency domain.

3. The method of claim 1, wherein a starting frequency position in a resource configuration for the second preamble format is set by adding or subtracting a frequency offset to or from a frequency grid selectable as a starting frequency position in a resource configuration for the first preamble format.

4. The method of claim 3, wherein the frequency offset is set to be equal to a minimum hop distance for the second preamble format, where the minimum hop distance is 1.25 kHz.

5. The method of claim 3, wherein the frequency offset is cell-specifically set.

6. The method of claim 3, wherein the frequency offset is set equally for terminals having the same time resource in the resource configuration for the second preamble format.

7. The method of claim 1, wherein a frequency grid spacing selectable as a starting frequency position in a resource configuration for the second preamble format is set to a value less than a frequency grid spacing selectable as a starting frequency position in a resource configuration for the first preamble format.

8. The method of claim 1, wherein a random access preamble ID (RAPID) for the second preamble format is distinguished by a starting frequency in a resource configuration for the second preamble format.

9. The method of claim 1, wherein a preamble boundary according to the second preamble format is configured to be aligned with a preamble boundary repeated $2^n$ times in a time domain according to the first preamble format, where n is a positive integer, and ^ denotes a power.

10. The method of claim 1, wherein, based on the PRACH configuration information indicating the second preamble format, the PRACH configuration information comprises index information indicating a period allowing transmission of the random access preamble to be started therein, where the index information has a value of 0 in a period containing a system frame number (SFN)=0.

11. The method of claim 1, wherein, based on the PRACH configuration information indicating the second preamble format, index information indicating a period allowing transmission of the random access preamble to be started therein is limited to satisfy (i mod N)=k, where i denotes the index information, N and k denote values pre-allocated to the terminal, and mod denote a modulo function.

12. A terminal for performing a random access procedure in a wireless communication system supporting a first preamble format and a second preamble format, the terminal comprising:
   a radio frequency (RF) transceiver; and
   a processor operatively connected to the RF transceiver,
   wherein the processor is configured to control the terminal to:
   receive physical random access channel (PRACH) configuration information; and
   transmit a random access preamble having the second preamble format, based on the second preamble format being indicated by the PRACH configuration information among the first preamble format and the second preamble format,
   monitor a random access response (RAR) message for the random access preamble transmission based on a plurality of RAR windows, and
   transmit an uplink message based on a detection of the RAR message,
   wherein 'N' number of PRACH resource periods are configured for the terminal to perform the random access preamble transmission 'N' number of times, where 'N' is an integer greater than 1,
   wherein at least one RAR window among the plurality of RAR windows is located prior to a last PRACH resource period among the 'N' number of PRACH resource periods, and
   wherein based on the RAR message being detected from the at least one RAR window that is located prior to the last PRACH resource period, the terminal is allowed to early transmit the uplink message without completion of the 'N' number of the random access preamble transmissions.

* * * * *